(12) United States Patent
Dierks, III

(10) Patent No.: US 12,401,774 B2
(45) Date of Patent: *Aug. 26, 2025

(54) MATCHING SEGMENTS OF VIDEO FOR VIRTUAL DISPLAY OF A SPACE

(71) Applicant: Dierks Technology, Inc., Spokane Valley, WA (US)

(72) Inventor: Eugene Herbert Dierks, III, Spokane Valley, WA (US)

(73) Assignee: DIERKS TECHNOLOGY, INC., Spokane Valley, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,175

(22) Filed: Jun. 19, 2023

(65) Prior Publication Data

US 2023/0412786 A1    Dec. 21, 2023

Related U.S. Application Data

(63) Continuation of application No. 17/339,703, filed on Jun. 4, 2021, now Pat. No. 11,683,462.

(51) Int. Cl.
*H04N 13/156* (2018.01)
*G06T 7/73* (2017.01)
(Continued)

(52) U.S. Cl.
CPC ............. *H04N 13/156* (2018.05); *G06T 7/74* (2017.01); *H04N 13/122* (2018.05); *H04N 13/221* (2018.05); *H04N 13/282* (2018.05)

(58) Field of Classification Search
CPC .. H04N 13/156; H04N 13/122; H04N 13/221; H04N 13/282; H04N 13/117; G06T 7/74; G06V 20/48
(Continued)

(56) References Cited

U.S. PATENT DOCUMENTS 8,797,315 B1    8/2014  Kuhne
9,786,097 B2   10/2017  Bell et al.
(Continued)

FOREIGN PATENT DOCUMENTS

CA         3069813 A1     1/2019

OTHER PUBLICATIONS

Office Action for U.S. Appl. No. 17/339,703,mailed on Mar. 23, 2022, Dierks II, Matching Segments of Video for Virtual Display of a Space:, 16 Pages.
(Continued)

*Primary Examiner* — Tung T Vo
(74) *Attorney, Agent, or Firm* — Lee & Hayes, P.C.

(57) ABSTRACT

Systems, methods, and non-transitory computer-readable medium storing instructions that, when executed, causes a processor to perform operations to display a three-dimensional (3D) space. The methods may include, with an imaging device, capturing a first series of frames as the imaging device travels from a first location to a second location within a space, and capturing a second series of frames as the imaging device travels from the second location to the first location. The method may also include determining a first segment in the first series of frames that matches a second segment in the second series of frames to create a segmentation dataset, generating video clip data based on the segmentation dataset, the video clip data defining a series of video clips, and displaying the series of video clips.

20 Claims, 8 Drawing Sheets

(51) Int. Cl.
*H04N 13/122* (2018.01)
*H04N 13/221* (2018.01)
*H04N 13/282* (2018.01)

(58) Field of Classification Search
USPC .......................................................... 348/43
See application file for complete search history.

(56) References Cited

U.S. PATENT DOCUMENTS

| | | | |
|---|---|---|---|
| 10,030,979 B2 | 7/2018 | Bjorke et al. | |
| 10,530,997 B2 | 1/2020 | Shan et al. | |
| 10,825,247 B1* | 11/2020 | Vincent | G06V 20/20 |
| 11,252,329 B1* | 2/2022 | Cier | H04N 23/53 |
| 2009/0248304 A1* | 10/2009 | Roumeliotis | H04W 4/027 |
| | | | 701/500 |
| 2010/0312670 A1* | 12/2010 | Dempsey | G06Q 30/0643 |
| | | | 709/227 |
| 2018/0074508 A1* | 3/2018 | Kleiner | G05D 1/2246 |
| 2018/0143756 A1 | 5/2018 | Mildrew et al. | |
| 2019/0020817 A1* | 1/2019 | Shan | H04N 23/698 |
| 2019/0162534 A1 | 5/2019 | Metzler et al. | |
| 2019/0179145 A1* | 6/2019 | Ibrahim | G02B 27/0172 |
| 2019/0183310 A1* | 6/2019 | Herron | G05D 1/0231 |
| 2019/0197769 A1 | 6/2019 | Khosrowpour | |
| 2019/0220019 A1* | 7/2019 | Tan | G01M 5/0033 |
| 2020/0092473 A1 | 3/2020 | Shan et al. | |
| 2020/0116493 A1 | 4/2020 | Colburn et al. | |
| 2020/0275023 A1 | 8/2020 | Birkler | |
| 2020/0296350 A1 | 9/2020 | Oh | |
| 2020/0336675 A1 | 10/2020 | Dawson et al. | |
| 2020/0408532 A1 | 12/2020 | Colburn et al. | |
| 2021/0089040 A1 | 3/2021 | Ebrahimi Afrouzi et al. | |
| 2021/0105313 A1 | 4/2021 | Wang et al. | |
| 2021/0125397 A1 | 4/2021 | Moulon et al. | |
| 2021/0385378 A1 | 12/2021 | Cier et al. | |
| 2022/0003555 A1 | 1/2022 | Colburn et al. | |
| 2022/0101557 A1* | 3/2022 | Niday | G06V 20/647 |
| 2022/0114291 A1* | 4/2022 | Li | G06T 19/00 |
| 2022/0224833 A1* | 7/2022 | Cier | H04N 5/445 |
| 2022/0269885 A1* | 8/2022 | Wixson | G06T 7/0002 |
| 2022/0269888 A1* | 8/2022 | Stoeva | G06T 19/006 |
| 2022/0394228 A1 | 12/2022 | Dierks | |
| 2023/0300312 A1* | 9/2023 | Kim | G03B 17/56 |
| | | | 348/47 |

OTHER PUBLICATIONS

Office Action for U.S. Appl. No. 17/339,703, mailed on Aug. 22, 2022, Dierks III, "Matching Segments of Video for Virtual Display of a Space", 45 Pages.

* cited by examiner

MATCHING SEGMENTS OF VIDEO FOR VIRTUAL DISPLAY OF A SPACE

CROSS-REFERENCE TO RELATED APPLICATION

This patent application is a continuation of and claims priority to U.S. patent application Ser. No. 17/339,703, filed Jun. 4, 2021, which is fully incorporated herein by reference.

TECHNICAL FIELD

The present disclosure relates generally to systems and methods for imaging a space. Specifically, the present disclosure relates to efficiently capturing images and/or video of a space and providing virtual navigation of that space in a non-linear fashion.

BACKGROUND

The capturing of images in a myriad of places and situations and for various purposes has become ubiquitous. For example, in scenarios such as real estate acquisition and development, property inspection, architectural analysis, general contracting, improvement cost estimation and other circumstances, it may be desirable to view the interior of a house, office, or other space without having to physically travel to and enter the space. Still images of the space provide a viewer of the images with a form of understanding relating to the interior of the space. However, still images do not provide an understanding of the layout of architectural features of the space as they spatially relate to one another. For example, it is difficult to fully understand the layout of various rooms or areas within the space with relation to one another. Thus, still images of the space do not allow the viewer to immerse themselves within the space and obtain a true visual interpretation thereof.

Some forms of imagery produce a number of interconnected panorama or 360 degree images that provide some level of understanding of the spatial flow within the space. These types of forms of imagery provide a greater level of spatial understanding and spatial flow within the space. In some of these types of systems, a user may transition from one point within the space to another. However, this transition is visually awkward as displayed to the user since moving from a first position where a first image is capture to a second position where a second image is captured results in the execution of a morphing algorithm or similar algorithm that results in disjointed, blurred, stretched, and/or unrecognizable imagery. This is because the morphing algorithms attempt to find corresponding points between the images and distort one into the other as they crossfade. At the point of transition, the viewer is unable to identify spaces between the first position and the second position with any level of clarity or understanding of the architecture, depth of field, distance, and other aspects of the space. For example, a window included within the imagery may look normal when viewed from the first position and/or the second position, but becomes stretched during the transition from the first position to the second position resulting in the window losing its depth of field and looking more like a picture on a wall rather than an actual window. This disjointed and obscured effect of these interconnected panorama or 360 degree images and the transitions between them results in the viewer sensing a break in the effect of being immersed within the space and a feeling of disjointedness and a lack of understanding of the metes and bounds of the space.

Further, a floor plan of the space may be provided to a viewer for a better understanding of the space. However, it has been estimated that roughly a third of the population can reasonably translate a two-dimensional floor plan into a mental conceptualization of a three-dimensional space. Thus, provision of a floor plan, while helpful to some, does not allow all to appropriately view and appreciate the space.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Figure 1:
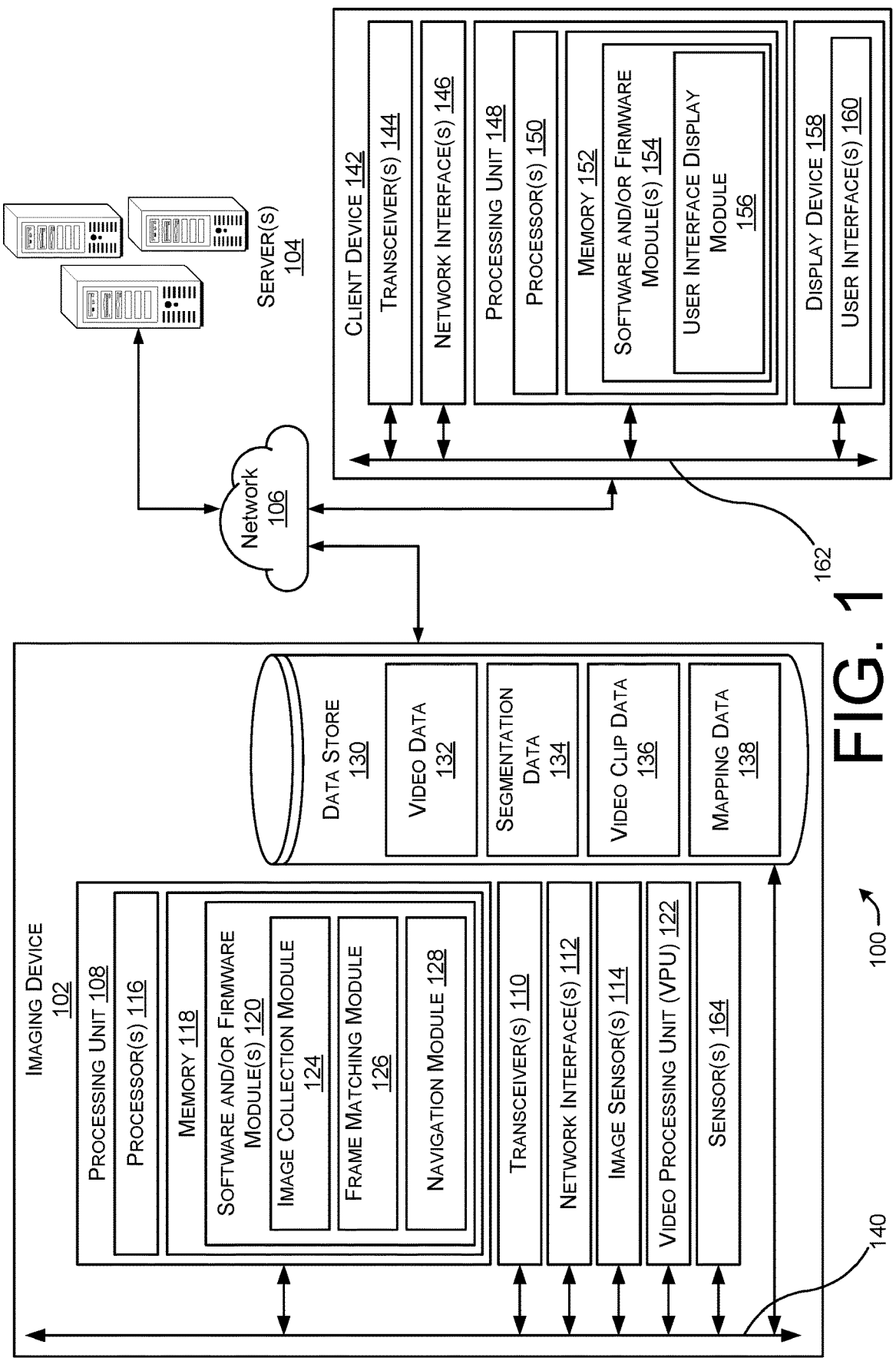
FIG. 1 illustrates a system-architecture diagram of a network that provides imaging, processing, and interactive display of a space, according to an example of the principles described herein.

The present systems and methods seek to present an uninterrupted, coherent, consistent, and logical depiction of a space such as the interior of a residence or other building. The present systems and methods seek to create a virtual space that provides a user who is able to view the space using a user interface (UI). The UI produced by the systems and methods described herein allows viewer to easily understand and appreciate distances, orientation of areas such as rooms within the space, position of objects within the space such as windows, doors, furnishings, fittings, etc.

The systems and methods described herein provide for fluid and identifiable transitions between positions within a space. In so doing, the user has an increased understanding of the space, spatial relationships of different areas within the space, and orientation within the space.

Overview

In the examples described herein, the systems and methods utilize one or more video clips taken during movement from a first position to a second position within a space, as well as during movement from the second position to the first position. This allows for attainment of video in two directions (e.g., a first direction and a second direction) along the path of movement. At the time of display of the space in a UI, the viewer may switch between viewing in the first direction and the second direction. In order to do this, a first plurality of frames captured in the first direction are algorithmically aligned with a second plurality of frames captured in the second direction. Frames from the first direction having a position at a certain point along the path are aligned with corresponding frames captured in the second direction that were captured at the same point along the path but in the opposite direction. In one example, the systems and methods described herein create close pairings of the first plurality of frames captured in the first direction and the second plurality of frames captured in the second direction. In one example, the alignment of frames from two different series or sets of frames creates a web of connected images. This creates a sense of seamless transition from the first position to the second position within the space as viewed by the user in the UI. Even in instances where the user controls the UI to stop at a point intermediate between the first position and the second position, the images presented depict the intermediate position based on the aligned frames without distortion.

Examples described herein provide a non-transitory computer-readable medium storing instructions that, when executed, causes a processor to perform operations. The operations include, with an imaging device, capturing a first series of frames as the imaging device travels from a first location to a second location within a space, and capturing a second series of frames as the imaging device travels from the second location to the first location. The operations also include determining a first segment in the first series of frames that matches a second segment in the second series of frames to create a segmentation dataset, generating video clip data based on the segmentation dataset, the video clip data defining a series of video clips, and displaying the series of video clips.

The non-transitory computer-readable medium may further include instructions that, when executed, causes a processor to perform operations including defining a number of coordinates and a number of angles of capture of a number of frames in the first series of frames and the second series of frames relative to at least a first frame of the number of frames, and storing the coordinates and angles of capture as mapping data in a database. The segmentation dataset may be created based at least in part on the mapping data. Generating the series of video clips based on the segmentation dataset may include normalizing a distance between the frames in the first series of frames and the second series of frames within the space based on the mapping data, removing at least one frame of the first series of frames or the second series of frames to normalize a distance traveled along the first segment and the second segment, and storing the normalized frames as the segmentation dataset. Defining the coordinates and the angles includes executing a visual simultaneous location and mapping (VSLAM) process. The number of coordinates may include x, y, and z coordinates within the space, and the number of angles of capture may include identification of roll, pitch, and yaw within the space.

The non-transitory computer-readable medium may further include instructions that, when executed, causes a processor to perform operations including, based at least in part on the video clip data, identifying at least one endpoint of at least two of the video clips, and defining the endpoint as a decision point within the space at which at least two available directions of movement within the space are presented in the video clips.

Determining the first segment in the first series of frames that matches the second segment in the second series of frames may include estimating which of a number of segments to utilize from within the first series of frames and within the second series of frames based at least in part on a score of best matching frames using at least the normalized distance and angles of capture between the first series of frames and the second series of frames to obtain selected segments, cropping ends of the selected segments based on a first threshold value, and collapsing at least one junction point between the segments based on a second threshold to eliminate overlapping segments. The imaging device captures the first series of frames and the second series of frames in a single video clip.

Examples described herein also provide a client device including a processor, and a non-transitory computer-readable media storing instructions that, when executed by the processor, causes the processor to perform operations. The operations may include, with an imaging device, capturing a first series of frames as the imaging device travels from a first location to a second location within a space, and capturing a second series of frames as the imaging device travels from the second location to the first location. The operations may further include defining a number of coordinates and a number of angles of capture of a number of frames in the first series of frames and the second series of frames relative to at least a first frame of the number of frames, and storing the coordinates and angles of capture as mapping data in a database. The operations may further include determining a first segment in the first series of frames that matches a second segment in the second series of frames based at least in part on the mapping data to create a segmentation dataset, generating video clip data based on the segmentation dataset, the video clip data defining a series of video clips, and displaying the series of video clips. The imaging device may include a 360 degree video capture device.

Generating the video clip data based on the segmentation dataset may include normalizing a distance between the frames in the first series of frames and the second series of frames within the space based on the mapping data, removing at least one frame of the first series of frames or the second series of frames to normalize a distance traveled along the first segment and the second segment, and storing the normalized frames as the segmentation dataset.

Defining the coordinates and the angles may include executing a visual simultaneous location and mapping (VSLAM) process on the captured first series of frames and captured second series of frames to define the coordinates and the angles of capture and storing the coordinates and angles of capture as the mapping data.

The number of coordinates include x, y, and z coordinates within the space, and the number of angles of capture include identification of roll, pitch, and yaw within the space. The operations may further include based at least in part on the video clip data, identifying at least one endpoint of at least two of the video clips, and defining the endpoint as a decision point within the space at which at least two available directions of movement within the space are presented in the video clips.

Determining the first segment in the first series of frames that matches the second segment in the second series of frames may include estimating which of a number of segments to utilize from within the in the first series of frames and the in the second series of frames based at least in part on a score of best matching frames using at least the normalized distance and angles of capture between the first series of frames and the second series of frames to obtain selected segments. Determining the first segment in the first series of frames that matches the second segment in the second series of frames may also include cropping ends of the selected segments based on a first threshold value and collapsing at least one junction point between the segments based on a second threshold to eliminate overlapping segments.

Examples described herein also provide a method of displaying a three-dimensional (3D) space. The method may include, with an imaging device, capturing a first series of frames as the imaging device travels from a first location to a second location within a space, and capturing a second series of frames as the imaging device travels from the second location to the first location. The method may also include determining a first segment in the first series of frames that matches a second segment in the second series of frames to create a segmentation dataset, generating video clip data based on the segmentation dataset, the video clip data defining a series of video clips, and displaying the series of video clips.

The method further include defining a number of coordinates and a number of angles of capture of a number of frames in the first series of frames and the second series of frames relative to at least a first frame of the number of frames based at least in part on execution of a visual simultaneous location and mapping (VSLAM) process, and storing the coordinates and angles of capture as mapping data in a database. The number of coordinates include x, y, and z coordinates within the space. The number of angles of capture include identification of roll, pitch, and yaw within the space.

The segmentation dataset is created based at least in part on the mapping data. Generating the series of video clips based on the segmentation dataset may include normalizing a distance between the frames in the first series of frames and the second series of frames within the space based on the mapping data, removing at least one frame of the first series of frames or the second series of frames to normalize a distance traveled along the first segment and the second segment, and storing the normalized frames as the segmentation dataset.

The method may further include, based at least in part on the video clip data, identifying at least one endpoint of at least two of the video clips, and defining the endpoint as a decision point within the space at which at least two available directions of movement within the space are presented in the video clips. Determining the first segment in the first series of frames that matches the second segment in the second series of frames may include estimating which of a number of segments to utilize from within the in the first series of frames and the in the second series of frames based at least in part on a score of best matching frames using at least the normalized distance and angles of capture between the first series of frames and the second series of frames to obtain selected segments. Determining the first segment in the first series of frames that matches the second segment in the second series of frames may further include cropping ends of the selected segments based on a first threshold value, and collapsing at least one junction point between the selected segments based on a second threshold to eliminate overlapping segments.

As used in the present specification and in the appended claims, the terms "space," "physical space," "subject space," or the like is meant to be understood broadly as any portion or extent of any three-dimensional expanse in which the systems and methods described herein are implemented. Space may refer to a physical location being imaged such as, for example, a building or the interior of the building. Examples described herein are described in the context of imaging a space within a residential or commercial building for the purposes of presenting the images via a network and/or virtually for the purpose of real estate sales. However, the present systems and methods may be utilized in any instance or situation where a space may be imaged for consumption by a user who is remote from the space.

Additionally, the techniques described in this disclosure may be performed as a method and/or by a system having non-transitory computer-readable media storing computer-executable instructions that, when executed by one or more processors, performs the techniques described above.

Example Embodiments

The present systems and methods improve the process of viewing a physical space from a computing device via a user interface (UI) in instances where a user is unable or would be inconvenienced by traveling to the location of the physical space. The present systems and methods allow for efficient capture of video of the space. Through the data processing of data defining the captured video, the space may be virtually navigated in a non-linear fashion without inclusion of disjointed, blurred, stretched, and/or unrecognizable imagery in the UI. Instead, through the data processing described herein, the virtually navigated space includes fluid and identifiable transitions between positions within the space in order to provide the user with an increased understanding of the space, spatial relationships of different areas within the space, and orientation within the space.

To accomplish the above, several techniques are described herein. First, an imaging device may be used to capture a 360 degree by 360 degree video including a plurality of frames of the space, and the captured video may be mapped into a number of segments of travel. The segments include paired frames that define a forward path paired with a reverse path for the segments of travel that include the same paths of travel but in opposite directions.

The speed of travel along the video segments are normalized. The systems and methods described herein also capture orientation data such as pitch, roll, and yaw for data processing in later processes via execution of VSLAM processing as described herein. The pitch, roll, and yaw may be classified as metadata associated with the video defining and being associated with a number of the frames of the video.

The systems and methods described herein also connect endpoints of the video segments to form a "web" of connected video segments. The UI may be provided to a client device such as a user's computing device so that a user may view the virtual space presented thereby. The user, via the UI, may virtually travel to the endpoint of one video segment, and select from a number of possible segments to virtually navigate from that endpoint in order to travel along a chosen path.

Each video segment includes a forward segment paired with a reverse segment. Thus, a user may, during interaction with the UI, turn at any point along the video segment. When this occurs, and the user view's of the space past 180 degrees (e.g., plus or minus 90 degrees) from the forward-facing direction towards the reverse-facing direction or vice versa, executable code will cause the view within the UI to be switched to a paired video frames or frames representing the opposite direction along the travel path. This ensures that the individual capturing the video (e.g., hereinafter referred to as videographer) is always out of view. Further, moving the view past 180 degrees (e.g., plus or minus 90 degrees) from the forward-facing direction towards the reverse-facing direction or vice versa also prepares the executable code to move in the reverse direction down the path representing the user instructing the UI to turn around 180 degrees (e.g., plus or minus 90 degrees) along the path of travel and/or travel in the opposite direction as originally traveled.

Metadata defining the pitch, roll, and yaw may be captured along with the video or derived in later processing via, for example, VSLAM processing as described herein. This metadata may be associated with the video as a whole, with segments or clips thereof, with individual frames of the video, and combinations thereof. The metadata compensates for the viewing angles of the video during playback to provide a smooth viewing experience. In one example, executable code may, when executed by a processing device, serve as a type of code-based or software gimbal that assists in the display and use of the metadata.

Turning now to the figures, FIG. 1 illustrates a system-architecture diagram 100 of a network that provides imaging, processing, and interactive display of a space, according to an example of the principles described herein. The system of FIG. 1 includes an imaging device 102, a number of server(s) 104 providing services related to images captured by the imaging device 102, and a client device 142 via which a user may view images captured by the imaging device 102 as supported by the server(s) 104. The imaging device 102, the server(s) 104, and the client device 142 may be communicatively coupled to one another via a network 106. The network may include any wired or wireless computing network including, for example, centralized or decentralized computing networks, cloud computing networks, a virtual network computing (VNC) network, a personal area network (PAN), a local area network (LAN), a wide area network (WAN), a campus area network (CAN), a metropolitan area network (MAN), a storage area network (SAN), a system area network (SysAN), an enterprise private network (EPN), a virtual private network (VPN), a cellular network, other types of computing networks, and combinations thereof. The network 106 may utilize any number of communication protocols including, for example, transmission control protocol (TCP) (e.g., TCP internet protocol (IP) (TCP/IP)), user datagram protocol (UDP), Bluetooth™ protocols, file transfer protocols (e.g., the file transfer protocol (FTP), secure shell (SSH) file transfer protocol, hypertext transfer protocol (HTTP), peer-to-peer (P2P) file transfer protocol, Systems Network Architecture (SNA) file transfer protocol, instant messaging (IM) protocols, local area network (LAN) messenger protocols, other communications and file transfer protocols, and combinations thereof. Further, the network 106 may include any number of computing devices that allow for the imaging device 102, the server(s) 104 and the client device 142 to communicate with one another. For example, the network 106 may include network appliances, servers, routers, switches, gateways, bridges, load balancers, firewalls, processors, edge devices, modules, or any other suitable device, component, element, or object operable to exchange information in a network environment.

The imaging device 102 may include any device capable of capturing a visual representation of a space including any and all objects within the space. In one example, the imaging device 102 may capture frames of images or other forms of visual data to produce still images and/or video of the space around the imaging device 102. In this manner, the imaging device may also be referred to as a video capture device. The imaging device 102 may include a digital imaging device. A digital imaging device may include any device capable of capturing visible and non-visible (e.g., infrared, ultraviolet, and electromagnetic wavelengths shorter or longer than visible wavelengths, etc.) electromagnetic radiation wavelengths. The digital imaging device may include, for example, a metal-oxide-semiconductor (MOS) imaging sensor, a MOS field-effect transistors (MOSFET) imaging sensor, a complementary MOS (CMOS) imaging sensor, a charge-coupled device (CCD) imaging sensor, an active-pixel sensor (APS), other types of imaging sensors, and combinations thereof. In one example, the imaging device 102 may include a plurality of imaging sensors as described in more detail below.

In one example, the imaging device 102 may further include other sensor(s) 164 including, for example, an altimeter, attitude sensors, a gyroscopic sensor, an inertial navigation sensor, a yaw-rate sensor, an accelerometer, a gravimeter, an inclinometer, a LIDAR device, an angular rate sensor, a light detection module, and one or more microphones, among others of a myriad of sensing devices, and combinations thereof. The sensor(s) 164 may be activated by execution of any of the software and/or firmware module(s) 120. For example, the sensor(s) 164 may be activated when the image collection module 124 is executed by the processor(s) 116 in order to collect additional data related to the images and/or frames of video data including orientation, acceleration, position, and other data defining the position and state of the imaging device 102, and other environmental data related to the imaging device 102. Further, the imaging device 102 may include a number of output devices such as, for example, one or more speakers or audio output ports, a display device, and other output devices.

The server(s) 104 may include any combination of computer hardware and software that provides functionality for other programs and devices such as the imaging device 102 and the client device 142. The server(s) 104 may provide various functionalities and services including, for example, sharing data and computing resources among the imaging device 102 and the client device 142, and/or performing computations for the imaging device 102 and the client device 142. The imaging device 102 and the client device 142 may each utilize a plurality of the server(s) 104. The server(s) 104 may include media servers, database servers, file servers, mail servers, print servers, web servers, game servers, virtual servers, proxy servers, computing servers, communication servers, and application servers, among a myriad of other types of server(s) 104 and their associated functionalities and services.

The client device 142 may be communicatively coupled to at least the server(s) 104 to allow the client device 142 to utilize the functionality and services provided by the server(s) 104. For example, any data defining images obtained by the imaging device 102 and stored, processed, and/or served by the server(s) 104 may be used by the client device 142 to view and manipulate the images. In this manner, the client device 142 may be utilized by, for example, a user in order to allow the user to view the images captured of the space in which the images were captured by the imaging device 102 as described herein. In the examples described herein, the images may include images of the interior and/or exterior of a building and/or property such as a residential or commercial property for the purpose of showcasing the residential or commercial property and offering the residential or commercial property for sale. The images of the residential or commercial property may be included as part of an online service provided to the public for the purpose of selling residential and/or commercial properties.

The elements of the system-architecture diagram 100 depicted in FIG. 1 including the imaging device 102, the server(s) 104, the client device 142, the network 106, and/or other systems and devices included within FIG. 1 are merely illustrative and are not intended to limit the scope of the present invention. These systems and/or devices may instead each include multiple interacting computing systems or devices, and may be connected to other devices that are not specifically illustrated, including via Bluetooth™ communication or other direct communication, through one or more networks such as the Internet, via the world-wide web, or via one or more private networks (e.g., mobile communication networks, etc.). In the examples described herein, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated system-architecture diagram 100 may in some embodiments be distributed in various components other than those specifically illustrated, some of the illustrated functionality of the system-architecture diagram 100 may not be provided, and/or other additional functionality may be available. Further, in an example, various functionality of the system-architecture diagram 100 may be provided by third-party partners of an operator of the system-architecture diagram 100 such as, for example, generated building interior representations may be provided to other systems that present that information to end users or otherwise use that generated information, data collected by the system-architecture diagram 100 may be provided to a third party for analysis and/or metric generation, etc.

Further, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in an example, some or all of the described techniques may be performed by hardware that include one or more processors and/or memory and/or storage when configured by one or more software programs (e.g., the system-architecture depicted in FIG. 1 and/or client software executing on the imaging device 102, the server(s) 104, the network 106, and/or the client device 142) and/or data structures, such as by execution of software instructions of the one or more software programs and/or by storage of such software instructions and/or data structures. Further, in an example, some or all of the systems and/or components may be implemented or provided in other manners, such as by consisting of one or more means that are implemented at least partially in firmware and/or hardware (e.g., rather than as a means implemented in whole or in part by software instructions that configure a particular CPU or other processor), including, but not limited to, one or more application-specific integrated circuits (ASICs), integrated circuits, controllers (e.g., by executing appropriate instructions, and including microcontrollers and/or embedded controllers), field-programmable gate arrays (FPGAs), complex programmable logic devices (CPLDs), a gate array, and other firmware and/or hardware devices. Some or all of the components, systems, and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components, and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, examples of the present disclosure may be practiced with other computer system configurations.

Turning now to the imaging device 102 of FIG. 1, the imaging device 102 may include example components that provide for the capturing of images of the space in which the imaging device 102 is deployed. As illustrated, the imaging device 102 may include a processing unit 108, transceiver(s) 110 (e.g., radio, modem, etc.), network interface(s) 112, image sensor(s) 114, and a video processing unit (VPU) 122. The processing unit 108 may include one or more processor(s) 116 configured to execute one or more stored instructions. The one or more processor(s) 116 may include one or more cores, microprocessors, central processing units, graphics processing units, or other processors usable to execute program instructions to implement the functionality described herein. Additionally, or alternatively, in some examples, some or all of the functions described may be performed in hardware, such as one or more application specific integrated circuit (ASIC), gate arrays, integrated circuits, controllers (e.g., by executing appropriate instructions, and including microcontrollers and/or embedded controllers), field-programmable gate arrays (FPGAs), complex programmable logic devices (CPLDs), other firmware and/or hardware-based logic devices.

The transceiver(s) 110 may include one or more hardware and/or software implemented transceivers to provide two-way communication with other network communication devices in the network 106 and/or other devices via the network 106. The transceiver(s) 110 may utilize any type of analog or digital, and any wired or wireless communication technologies to send and receive data. In one example, the transceiver(s) 110 may include different characteristics depending on the type of device implementing the transceiver(s) 110 and/or the type of data being transmitted.

Further, the imaging device 102 may include one or more network interface(s) 112 configured to provide communications between the imaging device 102 and other devices, such as devices associated with the system architecture of FIG. 1 including the server(s) 104, the network 106, the client device 142, and/or other systems or devices associated with the imaging device 102 and/or remote from the imaging device 102. The network interface(s) 112 may include devices configured to couple to personal area networks (PANs), wired and wireless local area networks (LANs), wired and wireless wide area networks (WANs), other types of networks, and combinations thereof. For example, the network interface(s) 112 may include devices compatible with the server(s) 104, the network 106, the client device 142, and/or other systems or devices associated with the imaging device 102.

The imaging device 102 may further include image sensor(s) 114. As mentioned above, the image sensor(s) 114 may include a MOS imaging sensor, a MOSFET imaging sensor, a CMOS imaging sensor, a CCD imaging sensor, an APS, other types of imaging sensors, and combinations thereof. In one example, the imaging device 102 may include a plurality of imaging sensors. The plurality of imaging sensors 114 in this example may be used to obtain images of the space in which the imaging device 102 is utilized in a forward and a backward direction relative to the imaging device 102. With the imaging device, a user such as a photographer may capture one or more frames or series of frames (e.g., video frames) of a subject space. The processor(s) 116 may cause the imaging sensor(s) 114 to activate in instances where the imaging device 102 is being used to capture images of the space.

In one example, the imaging device 102 may include a 360 degree by 360 degree (360°×360°) video camera. In one example, the 360°×360° video camera may include, for example, the Theta™ VT™, Theta™ Z1™, and Theta™ SC2, among other 360°×360° imaging devices developed and distributed by Ricoh Company, Ltd. In one example, the 360°×360° video camera may include, for example, the Go™ 2, and One™ X2™, among other 360°×360° imaging devices developed and distributed by Arashi Vision Inc. (dba Insta360). Using a 360°×360° video camera as the imaging device 102 allows for the capturing of a first series of frames and a second series of frames in a single video clip or in a single pass along a path within the subject space which is being captured. This allows for matching of frames between the forwards and backwards directions more uniform and computationally advantageous as described in more detail below.

Although more details are provided below, during the capture of the one or more frames or series of frames (e.g., video frames) of the subject space, the user may identify a number of paths that may provide views of the space that, in the video that is displayed on a display device, have common junction points or have common junction points to a possible extent. Further, as described in more detail below, at least one and, in one example, every path created depicting the subject space may include both a forward and back segment of video. The forward and backward segments of the video include video of a view of the subject space along both directions along the path. For example, in an instance where the user is walking north down a hallway with the imaging device 102 facing north, at a point in the capture of the subject space, the user may capture the same hallway, but walking south, with the imaging device 102 facing south. In these examples, the imaging device 102 may convert the fish-eye frames into an equilateral panorama, and may be captured with a frame rate that is sufficiently high relative to the walking speed of the user to where 75% or more of the captured frames may be dropped in a final conversion process in order to achieve a normalized pace of movement. More regarding the imaging device 102 and the use and functions thereof are described in more detail below.

The imaging device 102 may further include a video processing unit (VPU) 122. The VPU 122 may include any data processing device capable of causing the image sensor(s) 114 to capture a number of images and/or frames of video data, store the frames in the memory 118 or other data storage device, generate a number of video clips based on the captured frames, and/or display the frames or video clips. Specifically, along with the execution of software and/or firmware module(s) 120 described herein, the VPU 122 may cause a first series of frames to be captured as the imaging device 102 travels from a first location to a second location within a space, cause a second series of frames to be captured as the imaging device 102 travels from the second location to the first location, determine a first segment in the first series of frames that matches a second segment in the second series of frames to create a segmentation dataset, generate video clip data based on the segmentation dataset, the video clip data defining a series of video clips, and causing or providing for the display of the series of video clips on, for example, a display device.

The memory 118 may include any computing device capable of storing information for immediate use in the imaging device 102, and may include, for example, volatile and/or non-volatile semiconductor memory devices (e.g., memory cells built from MOS transistors on an integrated circuit) including, for example, flash memory, read-only memory (ROM), programmable read-only memory (PROM), erasable programmable read-only memory (EPROM), electrically erasable programmable read-only memory (EEPROM) memory, primary storage, dynamic random-access memory (DRAM), CPU cache memory, and static random-access memory (SRAM), among other types of memory devices.

The memory 118, as mentioned above, may include software and/or firmware module(s) 120 that may be executed by the processor(s) 116 and/or VPU 122 to achieve the functionality of the imaging device 102 as described herein. The software and/or firmware module(s) 120 may include, for example, an image collection module 124. The image collection module 124, once executed, may cause the image sensor(s) 114 to activate and capture a number of images and/or frames of video data. The image collection module 124 may also cause the images and/or frames of video data to be stored in persistent data storage such as, for example, the memory 118, the data store 130 of the imaging device 102, the data store 224, FIG. 2 of the server(s) 104, and/or other data storage devices described herein.

The image collection module 124 may be executed by the processor(s) 116 to capture a first series of frames from a first location to a second location. The execution of the image collection module 124 by the processor(s) 116 may cause the processor(s) 116 to instruct the image sensor(s) 114 to activate in order to capture images as described herein. The first location may include a first or starting position along a path within the subject space and the second location may be a second position or terminating position along the path within the subject space. In this manner, the path is captured in a forward direction and a backward direction. Further, the starting position and/or the terminating position may be located at junctions where a number of additional paths may start or terminate. In this manner, even though a single path may be used to capture the subject space, a plurality of segments of an overall path including, for example, a plurality of paths connected at a number of junctions may be captured.

In one example, all of the images and/or frames of video data utilized to depict the subject space may be captured in a single capture instance. For example, a user may capture an eight minute video clip comprised of 14,400 frames (e.g., approximately 480 seconds times 30 frames per second (fps)). In this example, a first segment may include frames numbered 120 through 300 and a second segment may include frames numbered 715 through 980 in the same original video clip. Further, in this example, frames numbered 120 and 980 may be roughly the same physical location in the subject space but facing opposite directions along a travel path. Thus, frames numbered 120 and 980 may be matched. Similarly, frames numbered 300 and 715 in this example may also be roughly the same physical location in the subject space but facing opposite directions along a travel path. Thus, frames numbered 300 and 715 may be matched. This matching may occur throughout two or more series of frames (e.g., segments of images and/or frames of video data) in order to obtain pairs of segments of images and/or frames of video data that match. The matched pairs of segments of images and/or frames of video data may be used to create a number of video clips as described herein for presentation to a user.

The data defining the images and/or frames of video data captured by the image sensor(s) 114 may be stored by the image collection module 124 and may include video data 132 stored within the data store 130 of the imaging device. The video data 132 may include, for example, raw, unprocessed data and/or may include processed data processed according to the methods described herein.

The software and/or firmware module(s) 120 of the memory 118 may also include, for example, a navigation module 128. Prior to other processes described herein including, for example, frame matching, the navigation module 128 may be executed by the processor(s) 116. The navigation module 128, may, when executed by the processor(s) 116, define coordinates and angles of capture of the frames of the first series of frames and the second series of frames relative to at least a first frame that is captured by the imaging device 102. The navigation module 128, may, when executed by the processor(s) 116, store the defined coordinates and angles of capture of the series of frames in a database as mapping data 138 within the data store 130 and/or other data storage devices described herein.

The navigation module 128, may also, when executed by the processor(s) 116, normalize a distance between the frames in a first series of frames and a second series of frames within the space based on the mapping data 138. In one example, the navigation module 128, may further, when executed by the processor(s) 116, remove at least one frame to normalize a distance traveled along the first segment and the second segment, and store the normalized frames as the segmentation data 134 within the data store 130 and/or other data storage devices described herein. The segmentation data 134 may form a segmentation dataset used in further processing described herein.

The software and/or firmware module(s) 120 of the memory 118 may also include, for example, a frame matching module 126. The frame matching module 126 may, when executed by the processor(s) 116, determine a first segment in the first series of frames captured by the image sensor(s) 114 that matches a second segment in the second series to find matches between the first segment and the second segment. This matching creates a segmentation dataset which may be stored as segmentation data 134 in the data store 130.

In one example, the frame matching module 126 may utilize the video data 132 defining the images and/or frames of video data captured by the imaging device 102 throughout the processing of the images and/or frames of video data described herein. In one example, the frame matching module 126 may utilize the video data 132 and/or mapping data 138 to generate the segmentation dataset defined by the segmentation data 134 as described herein.

The frame matching module 126, when executed, may also generate video clip data based on the segmentation data 134. The video clip data may define a series of video clips captured by the imaging device 102. Further, the video clip data may be stored as video clip data 136 in the data store 130.

The various elements of the imaging device 102 depicted in FIG. 1 and/or described herein may be interconnected through the use of a number of busses and/or network connections such as via a bus 140. In this manner, the data described in connection with the activation of the image sensor(s) 114 may be collected, processed, and/or stored for purposes of generating and providing a representation of the subject space (e.g. a residential or commercial building) in which the imaging device 102 is utilized, and for the purposes of presenting the images via the network 106.

The client device 142 may include any computing device including, including without limitation and for example, a workstation, a desktop computer, a laptop, a tablet, a network appliance, an e-reader, a smartphone, or other computing device consumer electronics, wearable devices, digital music player devices, handheld gaming devices, PDAs, wireless phones, Internet appliances, and various other consumer products. The transceiver(s) 144 of the client device may include one or more hardware and/or software implemented transceivers to provide two-way communication with other network communication devices in the network 106 and/or other devices via the network 106 including the imaging device 102 and/or the server(s) 104. The transceiver(s) 144 may utilize any type of analog or digital, and any wired or wireless communication technologies to send and receive data. In one example, the transceiver(s) 144 may include different characteristics depending on the type of device implementing the transceiver(s) 144 and/or the type of data being transmitted.

Further, the client device 142 may include one or more network interface(s) 146 configured to provide communications between the client device 142 and other devices, such as devices associated with the system architecture of FIG. 1 including the imaging device 102, the server(s) 104, the network 106, and/or other systems or devices associated with the client device 142 and/or remote from the client device 142. The network interface(s) 146 may include devices configured to couple to personal area networks (PANs), wired and wireless local area networks (LANs), wired and wireless wide area networks (WANs), other types of networks, and combinations thereof. For example, the network interface(s) 146 may include devices compatible with the imaging device 102, the server(s) 104, the network 106, and/or other systems or devices associated with the client device 142.

The client device 142 may further include a processing unit 148 and a display device 158. The processing unit 148 may include a number of processor(s) 150 and memory 152.

The processor(s) 150 may include one or more cores, microprocessors, central processing units, graphics processing units, or other processors usable to execute program instructions to implement the functionality described herein. Additionally, or alternatively, in some examples, some or all of the functions described may be performed in hardware, such as one or more application specific integrated circuit (ASIC), gate arrays, integrated circuits, controllers (e.g., by executing appropriate instructions, and including microcontrollers and/or embedded controllers), field-programmable gate arrays (FPGAs), complex programmable logic devices (CPLDs), other firmware and/or hardware-based logic devices.

The memory 152 may include any computing device capable of storing information for immediate use in the imaging device 102, and may include, for example, volatile and/or non-volatile semiconductor memory devices (e.g., memory cells built from MOS transistors on an integrated circuit) including, for example, flash memory, read-only memory (ROM), programmable read-only memory (PROM), erasable programmable read-only memory (EPROM), electrically erasable programmable read-only memory (EEPROM) memory, primary storage, dynamic random-access memory (DRAM), CPU cache memory, and static random-access memory (SRAM), among other types of memory devices.

The memory 152, as mentioned above, may include software and/or firmware module(s) 154 that may be executed by the processor(s) 150 to achieve the functionality of the client device 142 as described herein. The software and/or firmware module(s) 120 may include, for example, a user interface display module 156 to display the outcome of the capturing, processing, and storing of images (e.g., video frames, video segments, and video clips) provided by the imaging device 102 within a user interface (UI) 160 displayed on a display device 158 of the client device. The display device 158 may include any device capable of displaying to a user the captured, processed, and/or stored images (e.g., video frames, video segments, and video clips) in any form including, for example, two-dimensionally (2D), three-dimensionally (3D), non-virtually, virtually, in a virtual reality environment, in an augmented reality environment, among other forms. Thus, the display device 158 may include a computer monitor, a laptop monitor, a mobile device monitor, a tablet monitor, a digital projector, a touch screen device, a printing device, a heads up display (HUD) device, a virtual reality headset and/or device, an augmented reality headset and/or device, other types of computer output devices, and combinations thereof.

The user interface display module 156 may, when executed by the processor(s) 150, display, for example, the images of the subject space as captured by the imaging device 102. In one example, the client device 142 may obtain the images from the server(s) 104 as the server(s) 104 may obtain and/or store the images from the imaging device 102. In one example, the client device 142 may obtain the images from the imaging device 102 in real time or as stored data. In these examples, the transceiver(s) 110, 144, and 234, FIG. 2 and/or the of the imaging device 102, the client device 142, and the server(s) 104 In this manner, the outcome of the capturing, processing, and storing of images (e.g., video frames, video segments, and video clips) provided by the imaging device 102 within the UI 160 displayed on the display device 158 of the client device 142.

The various elements of the client device 142 depicted in FIG. 1 and/or described herein may be interconnected through the use of a number of busses and/or network connections such as via a bus 162. In this manner, the data described in connection with the collection, processing, and/or storage of images including video for purposes of generating and providing a representation of the subject space (e.g. a residential or commercial building) in which the imaging device 102 is utilized, and for the purposes of presenting the images via the network 106.

Figure 2:
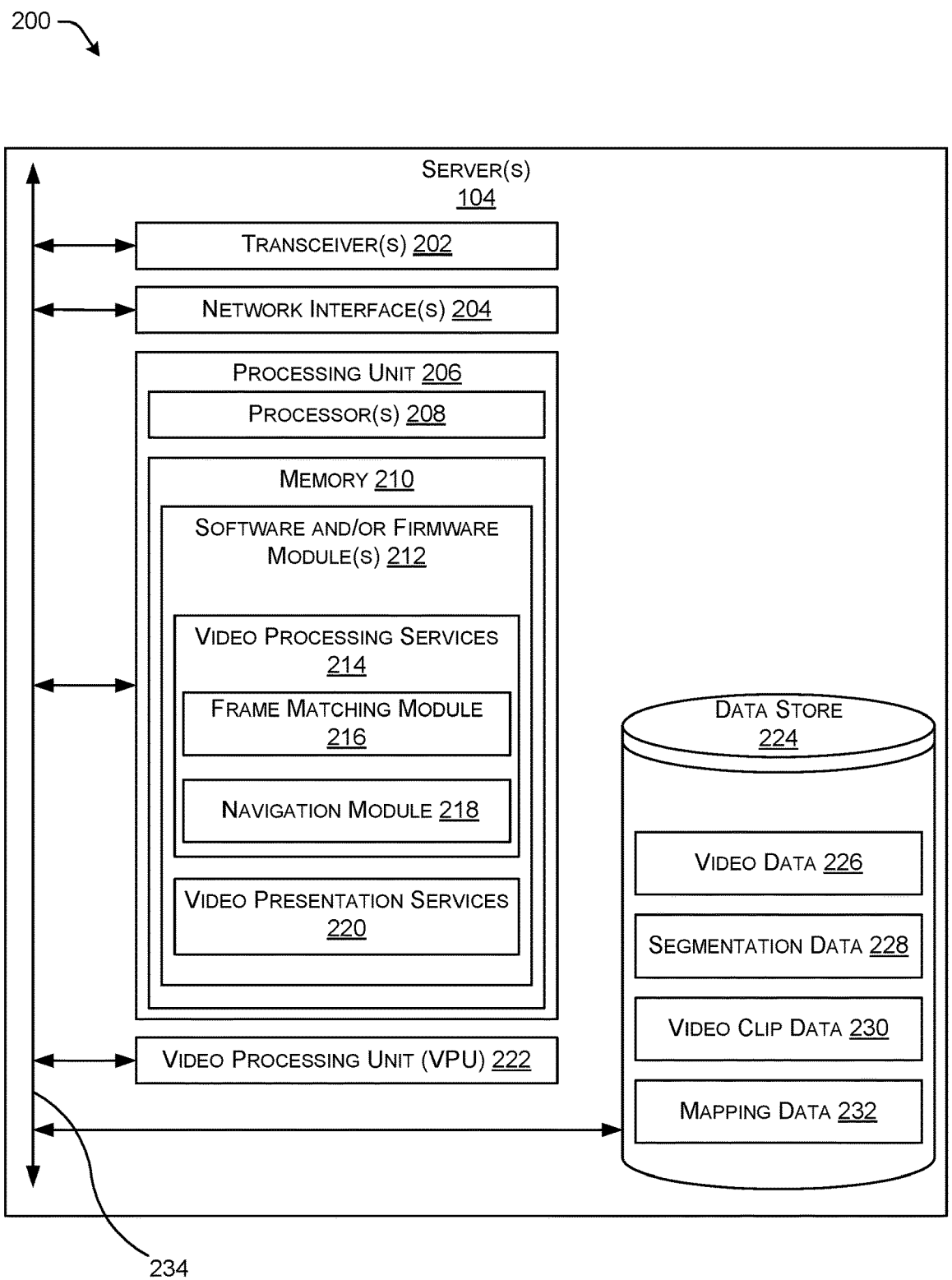
FIG. 2 is a component diagram of example components of server(s), according to an example of the principles described herein.

FIG. 2 is a component diagram 200 of example components of the server(s) 104, according to an example of the principles described herein. As mentioned above, the server(s) 104 may include any combination of computer hardware and software that provides functionality for other programs and devices such as the imaging device 102 and the client device 142. The server(s) 104 may provide various functionalities and services including, for example, sharing data and computing resources among the imaging device 102 and the client device 142, and/or performing computations for the imaging device 102 and the client device 142. The imaging device 102 and the client device 142 may each utilized a plurality of the server(s) 104. The server(s) 104 may include media servers, database servers, file servers, mail servers, print servers, web servers, game servers, virtual servers, proxy servers, computing servers, communication servers, and application servers, among a myriad of other types of server(s) 104 and their associated functionalities and services.

The services provided by the server(s) 104 may be provided "as a service" (aaS) such as services provided in the context of cloud computing for the imaging device 102 and/or the client device 142. For example, the services provided by the server(s) 104 may be provided as an application programming interface (API) as a service (API-aaS) providing an interface that defines interactions between multiple software applications such as the software and/or firmware modules 120, 154, 212 and/or hardware of the imaging device 102, the client device 142 and/or the server(s) 104. Further, the services provided by the server(s) 104 may be provided as a content as a service (CaaS), communications platform as a service (COMaaS), data as a service (DaaS), database as a service (DBaaS), hardware as a service (HaaS), infrastructure as a service (IaaS), Internet of Things as a service (IoTaaS), platform as a service (PaaS), software as a service (SaaS), anything as a service (Xaas), and other types of services provided via the server(s) 104 and cloud computing service models, and combinations thereof.

The server(s) 104 may be communicatively coupled to the imaging device 102 and/or the client device 142 to allow the imaging device 102 and/or the client device 142 to utilize the functionality and services provided by the server(s) 104. For example, any data defining images obtained by the imaging device 102 and stored, processed, and/or served by the server(s) 104 may be used by the client device 142 to view and manipulate the images. In this manner, the imaging device 102 and/or the client device 142 may be utilized by, for example, a user in order to allow the user to capture and/or view the images captured of the space in which the images were captured by the imaging device 102 as described herein. In the examples described herein, the images may include images of the interior and/or exterior of a building and/or property such as a residential or commercial property for the purpose of showcasing the residential or commercial property and offering the residential or commercial property for sale. The images of the residential or commercial property may be included as part of an online service provided to the public for the purpose of selling residential and/or commercial properties by the server(s) 104.

The server(s) 104 may include example components that provide for the collection of data defining images of the subject space as captured by the imaging device 102 and transmitted to the server(s) 104. The example components of the server(s) 104 may also provide for the storage of the data defining the images. Still further, the example components of the server(s) 104 may also provide for the processing of the data defining the images in addition to or in place of the processing provided by the imaging device 102 as described herein. Even still further, the server(s) 104 may also provide for the provision or serving of the data defining the images to other computing devices including the client device 142.

As illustrated in FIG. 2, the server(s) 104 may include a processing unit 206, transceiver(s) 202 (e.g., radio, modem, etc.), network interface(s) 204, and a VPU 222. The processing unit 206 may include one or more processor(s) 208 configured to execute one or more stored instructions. The one or more processor(s) 208 may include one or more cores, microprocessors, central processing units, graphics processing units, or other processors usable to execute program instructions to implement the functionality described herein. Additionally, or alternatively, in some examples, some or all of the functions described may be performed in hardware, such as one or more application specific integrated circuit (ASIC), gate arrays, integrated circuits, controllers (e.g., by executing appropriate instructions, and including microcontrollers and/or embedded controllers), field-programmable gate arrays (FPGAs), complex programmable logic devices (CPLDs), other firmware and/or hardware-based logic devices.

The transceiver(s) 202 may include one or more hardware and/or software implemented transceivers to provide two-way communication with other network communication devices in the network 106 and/or other devices via the network 106. The transceiver(s) 202 may utilize any type of analog or digital, and any wired or wireless communication technologies to send and receive data. In one example, the transceiver(s) 202 may include different characteristics depending on the type of device implementing the transceiver(s) 202 and/or the type of data being transmitted.

Further, the server(s) 104 may include one or more network interface(s) 204 configured to provide communications between the server(s) 104 and other devices, such as devices associated with the system architecture of FIG. 1 including the imaging device 102, the network 106, the client device 142, and/or other systems or devices associated with the server(s) 104 and/or remote from the server(s) 104. The network interface(s) 204 may include devices configured to couple to personal area networks (PANs), wired and wireless local area networks (LANs), wired and wireless wide area networks (WANs), other types of networks, and combinations thereof. For example, the network interface(s) 204 may include devices compatible with the imaging device 102, the network 106, the client device 142, and/or other systems or devices associated with the server(s) 104.

The server(s) 104 may further include a video processing unit (VPU) 222. The VPU 222 may include any data processing device capable of processing data defining the number of images and/or frames of video data captured by the image sensor(s) 114 of the imaging device 102 and transmitted to the server(s) 104. The VPU 222 may also cause the data defining the number of images and/or frames of video data to be stored in the memory 210, in the data store 224 as video data 226, and/or other data storage device.

The VPU 222 may further generate a number of video clips based on the captured frames. Specifically, along with the execution of software and/or firmware module(s) 212 described herein, the VPU 222 may determine a first segment in the first series of frames that matches a second segment in the second series of frames to create segmentation data 134. The segmentation data 134 forms a segmentation dataset. Further, the VPU 222 may generate video clip data based on the segmentation data 134. The video clip data defines a series of video clips. Still further, the VPU 222 may cause or provide for the display of the series of video clips on, for example, a display device such as the display device 158 of the client device 142.

The memory 210 of the server(s) 104 may include any computing device capable of storing information for immediate use in the server(s) 104, and may include, for example, volatile and/or non-volatile semiconductor memory devices (e.g., memory cells built from MOS transistors on an integrated circuit) including, for example, flash memory, read-only memory (ROM), programmable read-only memory (PROM), erasable programmable read-only memory (EPROM), electrically erasable programmable read-only memory (EEPROM) memory, primary storage, dynamic random-access memory (DRAM), CPU cache memory, and static random-access memory (SRAM), among other types of memory devices.

As mentioned above, the transceiver(s) 202 and/or the network interface(s) 204 of the server(s) 104 may obtain image data from the imaging device 102. This image data may include the images and/or frames of video data captured by the image sensor(s) 114 of the imaging device 102, and, in one example, may include raw, unprocessed data. The server(s) 104 may then store this image data in, for example, the data store 224 as video data 226.

The memory 210, as mentioned above, may include software and/or firmware module(s) 212 that may be executed by the processor(s) 208 and/or VPU 222 to achieve the functionality of the server(s) 104 as described herein. The software and/or firmware module(s) 212 may include, for example, video processing services 214 including a frame matching module 216. Similar to the frame matching module 126 of the imaging device 102, the frame matching module 216 of the server(s) 104 may, when executed by the processor(s) 208, determine a first segment in the first series of frames captured by the image sensor(s) 114 that matches a second segment in the second series to find matches between the first segment and the second segment. This matching creates a segmentation dataset which may be stored as segmentation data 228 in the data store 224.

The frame matching module 216, when executed, may also generate video clip data based on the segmentation data 228. The video clip data may define a series of video clips captured by the imaging device 102. Further, the video clip data may be stored as video clip data 230 in the data store 224. In one example, metadata defining the pitch, roll, and yaw as well as other orientation data such as direction, distance, and position in space described herein may be captured along with the images and/or frames of video data or may be derived via the execution of the VSLAM processing described herein. This metadata may be associated with the images and/or frames of video data as a whole, with segments or video clips thereof, with individual frames of the images and/or frames of video data, and combinations thereof. The metadata may be used to assist in the matching of segments of the images and/or frames of video data.

The video processing services 214 of the software and/or firmware module(s) 212 of the memory 210 may also include a navigation module 218. The navigation module 218, may, when executed by the processor(s) 208, define coordinates and angles of capture of the frames of the first series of frames and the second series of frames relative to at least a first frame that is captured by the imaging device 102. The data defining the coordinates and angles may be stored as metadata associated with the images and/or frames of video data. The coordinates and angles of capture of the frames of the first series of frames and the second series of frames may include orientation data defining an orientation of the imaging device 102 such as pitch, roll, and yaw. As mentioned above, metadata defining the pitch, roll, and yaw as well as other orientation data such as direction, distance, and position in space may be captured along with the images and/or frames of video data or derived in later processing using VSLAM processing. This metadata may be associated with the images and/or frames of video data as a whole, with segments or video clips thereof, with individual frames of the images and/or frames of video data, and combinations thereof. The metadata may also be used to compensate for the viewing angles of resulting video clips during playback to provide a smooth viewing experience. In one example, executable code may, when executed by a processing device, serve as a type of code-based or software gimbal that assists in the display and use of the metadata. The navigation module 218, may, when executed by the processor(s) 208, store the defined coordinates and angles of capture of the series of frames in a database as mapping data 232 within the data store 130 and/or other data storage devices described herein.

The navigation module 218, may also, when executed by the processor(s) 208, normalize a distance between the frames in a first series of frames and a second series of frames within the space based on the mapping data 232. In one example, the navigation module 218, may further, when executed by the processor(s) 208, remove at least one frame to normalize a distance traveled along the first segment and the second segment, and store the normalized frames as the segmentation data 228 within the data store 224 and/or other data storage devices described herein.

The software and/or firmware module(s) 212 of the memory 210 may also include video presentation services 220. The video presentation services 220 may, when executed by the processor(s) 208, cause video clip data 228 stored within the data store 224 of the server(s) 104 and/or video clip data 136 stored in the data store 130 of the imaging device 102 to be transmitted to the client device 142 for processing and display on the client device 142. The video presentation services 220 may also cause executable code to be transmitted to the client device 142 along with the video clip data 136, 228 to allow the client device 142 to display the video clip data 136, 228.

The various elements of the server(s) 104 depicted in FIG. 2 and/or described herein may be interconnected through the use of a number of busses and/or network connections such as via a bus 234. In this manner, the data described in connection with the activation of the image sensor(s) 114 of the imaging device 102 may be transmitted to the server(s) 104, collected, processed, and/or stored for purposes of generating and providing a representation of the subject space (e.g. a residential or commercial building) in which the imaging device 102 is utilized, and for the purposes of presenting the images via the network 106 to, for example, the client device 142.

Figure 3:
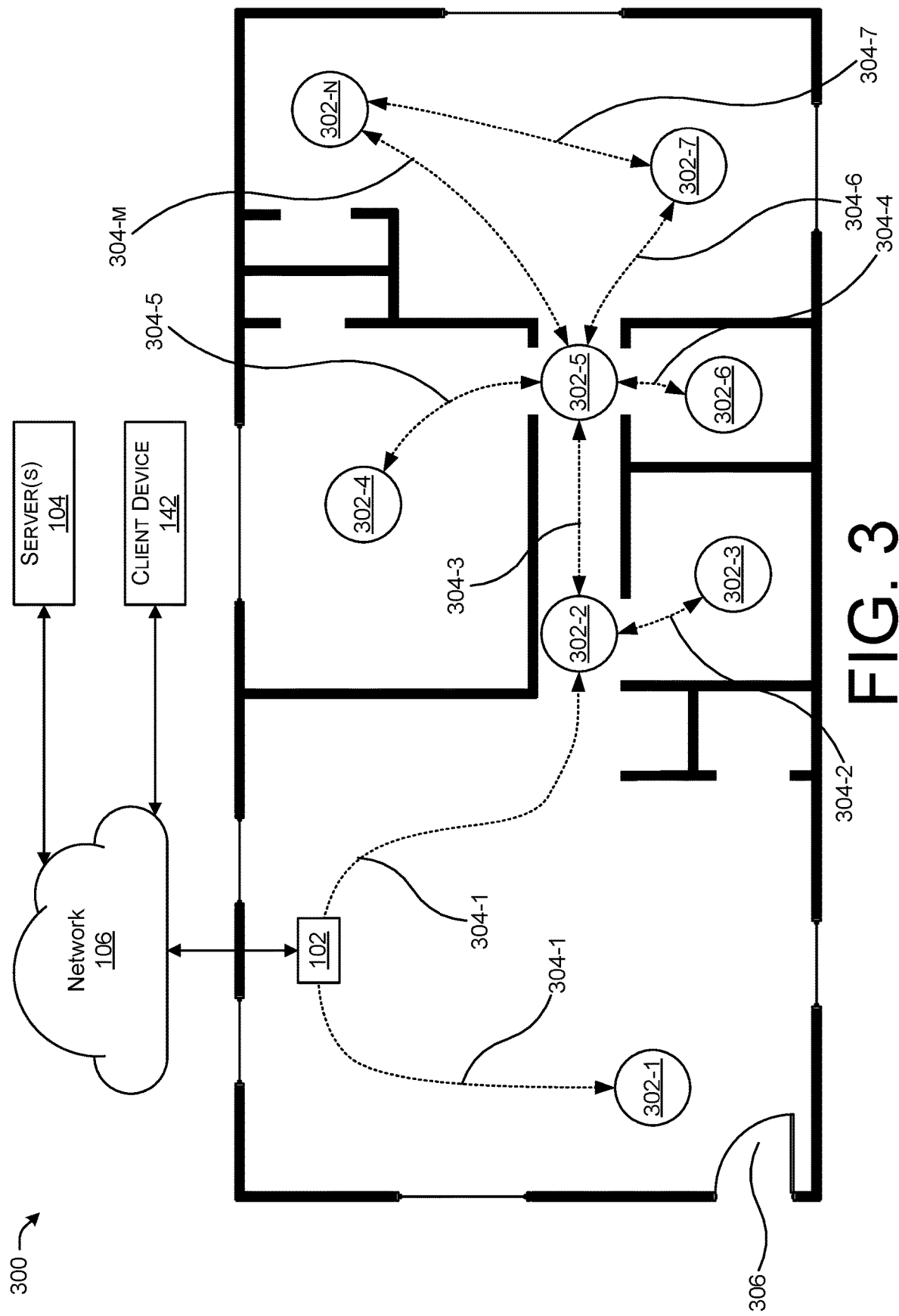
FIG. 3 illustrates a diagram of an interior of a building used as an example space in which the systems and methods of the present disclosure may be executed, according to an example of the principles described herein.

FIG. 3 illustrates a diagram of an interior of a building 300 used as an example space in which the systems and methods of the present disclosure may be executed, according to an example of the principles described herein. A number of images and/or frames of video data captured of the interior of the building 300 may be captured by the imaging device 102 as the imaging device 102 is moved through the interior of the building to a sequence of multiple viewing locations or junctions 302-1, 302-2, 302-3, 302-4, 302-5, 302-6, 302-7, ... 302-N, where N is any integer greater than or equal to 1 (collectively referred to herein as junction(s) 302 unless specifically addressed otherwise). The junctions 302 serve as waypoints along a number of travel paths 304-1, 304-2, 304-3, 304-4, 304-5, 304-6, 304-7, ... 304-M, where M is any integer greater than or equal to 1 (collectively referred to herein as travel path(s) 304 unless specifically addressed otherwise. The navigation module 128 of the imaging device 102 may automatically perform or assist in the capturing of the data representing the interior of the building 300, as well as further analyze the captured data to generate a visual representation of the interior of the building 300, as discussed further herein. In one example, the navigation module 128 of the imaging device 102 may be executed as a local application. In one example, the navigation module 128 of the imaging device 102 may be executed in part or in whole on one or more other computing systems or devices that are remote from the building 300.

In operation, a user seeking to capture images and/or frames of video data associated with the imaging device 102 may enter the interior of the building 300 via a door 306 and arrive with the imaging device 102 at a first junction 302-1 within a first room of the building 300. In response to one or more interactions of the user with the imaging device 102, the processor(s) 116 of the imaging device 102 may execute the image collection module 124 and any additional sensors, software and/or hardware used to capture images and/or define position and orientation of the imaging device 102 within the interior of the building 300. The image collection module 124 initiates capture of the images and/or frames of video data, capturing a view of the interior of the building 300 from the first junction 302-1 including some or all of a first room, and optionally small portions of one or more other adjacent or nearby rooms, such as through doors, hallways or other connecting architectures of the interior of the building 300.

In one example, because the image collection module 124 of the imaging device 102 has been executed causing the image sensor(s) 114 to activate in order to obtain the images and/or frames of video data, the additional sensor(s) 164 may also be activated to monitor, and/or initiate concurrent recording of various data provided by the sensor(s) 164. For example, the image collection module 124 may cause the sensor(s) 164 to monitor orientation, acceleration, position, and other data defining the position and state of the imaging device 102 via data provided by the sensor(s) 164 and associate the data defining the orientation, acceleration, position, and other data defining the position and state of the imaging device 102 with the recorded images and/or frames of video data. In one example, the image collection module 124 may analyze images and/or frames of video data during the image capture process to determine and/or automatically correct issues regarding the recorded images and/or frames of video data, such as to correct or compensate for an undesirable level of exposure, focus, motion blur, or other image quality issues.

In one example, the image collection module 124, when executed by the processor(s) 116, may provide real-time feedback to the user of the imaging device 102 via one or more guidance cues during the recording of the images and/or frames of video data of the interior of the building 300, such as to provide guidance for improving or optimizing movement of the imaging device 102 during the recording process. For example, the image collection module 124 may determine (such as based on sensor data provided by sensor(s) 164) that the imaging device 102 is being conveyed within the building at too slow or too fast of a rate to record high quality video, and if so may provide an auditory, visual, or other appropriate notification to indicate that the user should speed up or slow down the conveyance of the imaging device 102 more slowly during the recording process. In one example, the image collection module 124 may determine that the imaging device 102 is shaking or otherwise failing to provide high quality video (such as based on sensor data or one or more analyses of particular captured video frames), and if so may provide a notification to advise the user of the problem. In one example, the image collection module 124 may provide a notification to the user if it is determined that a particular junctions 302 is unsuitable for capturing information about the interior of the building 300, such as if the image collection module 124 detects that lighting conditions or other environmental factors for the present junctions 302 are negatively affecting the image capture process. In one example, the image collection module 124 may re-initiate the image capture process once one or more conditions interfering with high-quality recording have been alleviated.

Further, in one example, the image collection module 124 may prompt a user for information regarding one or more of the junctions 302 being captured, such as to provide a textual or auditory identifier to be associated with a junction 302 (e.g., "Room 1," "Living Room," "Office," "Bedroom 1" or other identifier), or to otherwise capture descriptive information from the user about the room (e.g., a description of built-in features, a history of remodels, information about particular attributes of the interior space being recorded, etc.). In other embodiments, such identifiers and/or other descriptive information may be determined in other manners, including automatically analyzing video and/or other recorded information for a building (e.g., using machine learning) for the determination or manual entry of data during or after capture of the images and/or frames of video data. In one example, such acquired or otherwise determined identifiers and/or other descriptive information may be later incorporated in or otherwise utilized with the captured information for a junction 302, such as to provide a textual or auditory indication of the identifier or other descriptive information during subsequent display or other presentation of the interior of the building 300 by the image collection module 124 or device described herein (or by another system that receives corresponding information from the image collection module 124).

In one example, the image collection module 124 may further determine to modify one or more parameters of the image sensor(s) 114 as part of improving quality of or otherwise improving some or all capture of images and/or frames of video data of the interior of the building 300. For example, the image collection module 124 may automatically determine to use one or more of various exposures, apertures, and focus parameters; and may automatically adjust one or more parameters based on a type of lens or lenses used by the imaging device 102, such as if the imaging device 102 includes multiple lenses of different focal lengths or to compensate for an atypical lens type (e.g., "fisheye," wide-angle, or telephoto lenses), and/or may use an external camera (e.g., a 360° camera that acquires data in at least 360° in a single frame or otherwise simultaneously) as the image sensor(s) 114 and associated optics. The image collection module 124 may, in one example, also initiate presentation of user feedback (e.g., display of one or more GUI elements to the user; use of audio and/or tactile feedback, whether instead of or in addition to visual information, etc.) to suggest parameters of the imaging system for modification by the user in order to improve video recording quality in a particular embodiment or situation (e.g., if the image collection module 124 is unable to automatically modify such parameters). In one example, the capture of some or all of the video at one or more junctions 302 may use additional equipment to assist in the capture, such as one or more of a tripod, additional lighting, a 3D laser scanner and rangefinder (e.g., using LIDAR) or other depth finder, an infrared emitter and/or detector, an ultraviolet emitter and/or detector, one or more external microphones, etc.

In one example, at a time after initiating the capture of images and/or frames of video data defining the interior of the building 300 in the first room, the image collection module 124 may automatically determine that the first junction 302-1 has been adequately captured, such as by determining that a 360°×360° image or video, or that sufficient data is otherwise acquired. For example, the image collection module 124 may determine that an entirety or a sufficient percentage of images and/or frames of video data defining a spherical field of view around the imaging device 102 has been captured. In one example, the image collection module 124 may provide one or more guidance cues to the user of the imaging device 102 to indicate that a capture of the interior of the building 300 from the first junction 302-1 is completed and that the user may proceed to additional junctions 302 within the interior of the building 300. In one example, capture of a particular junction 302 may not require an entirety of the spherical field of view around the imaging device 102 to be captured in order to be adequately completed. For example, junctions 302 in close proximity to walls or corners may be adequately represented by only a portion of the spherical field of view around the imaging device 102 to be captured. Further, in one example, the image collection module 124 may create a panorama image for a particular junction 302 without the imaging device 102 capturing the entirety of the spherical field of view around the imaging device 102 while recording video from that junction 302. In this example, the image collection module 124 may compensate for the portion of the spherical field of view around the imaging device 102 being captured in various manners, including but not limited to: limiting a number of component images to include in the panorama image if a disparate quantity of video information is recorded from the junction 302 for other portions of the interior of the building 300; generating one or more interpolated component images that do not wholly correspond to a single video frame recorded from the junction 302; or other manner, and with the resulting panorama image optionally being less than 360 degrees.

In one example, once the first junction 302-1 has been captured in the first room, the imaging device 102 may be moved along travel path 304-1 as the user carries it to a second or next junction 302 (e.g., junction 302-2), which in this example is in a different second room (e.g., a hallway). As the imaging device 102 is moved between junctions 302, the image collection module 124 may capture linking information that includes acceleration data defining, for example, orientation data such as pitch, roll, and yaw associated with the movement of the imaging device 102, such as that received from the sensor(s) 164, and, in one example, may capture additional information received from other of the sensor(s) 164, including to capture images and/or frames of video data or other visual information along at least some of the travel path 304. In one example, depending upon specific configuration parameters of sensor(s) 164, disparate quantities of acceleration data may be collected corresponding to movement of the imaging device 102 along travel path 304. For example, acceleration data and other sensor data may be received from the sensor modules at regular periodic intervals (e.g., between 1 and 2,000 data points a second), while other scenarios and/or sensor modules may result in such sensor data being received at any time or interval. In this manner, the image collection module 124 may receive quantities of orientation, acceleration, position, and other data defining the orientation of the imaging device 102 including, for example, pitch, roll, and yaw and state of the imaging device 102 during travel of the imaging device 102 between junctions 302 depending on the capabilities and configuration of the sensor(s) 164 included within the imaging device 102.

In one example, the image collection module 124 may further determine to terminate capture of the images and/or frames of video data for a junction 302 in various manners. Termination of the capture of the images and/or frames of video data for a junction 302 may be, for example, based on automatic detection of movement away from the junction 302, based on one or more defined user preferences, based on an explicit user request, based on capture of an entirety or a predefined percentage of the spherical field of view around the imaging device 102 or period of non-movement or other determination that the junction 302 is adequately captured, among other indications that capture of the images and/or frames of video data may be terminated.

In one example, the image collection module 124 may continue capturing the images and/or frames of video data without termination between capturing the images and/or frames of video data at a first junction 302 and subsequent movement of the imaging device 102 along travel path 304. In this example, the image collection module 124 may associate with the images and/or frames of video data, either at the time of capture or during later processing of the images and/or frames of video data described herein, one or more indications of demarcation including markers or separation points. In one example, the demarcations may be automatically identified by the imaging device 102 executing the image collection module 124 and activating the image sensor(s) 114 and sensor(s) 164 by detecting a change between receiving sensor data indicative of stopping or pausing at a junction 302 and receiving sensor data indicative of lateral or vertical movement typically associated with movement between the junctions 302. In one example, the indications of demarcations may be made by the user providing inputs such as activation of a button on the imaging device 102, audible commands to the imaging device 102 received from the user, and other types of user inputs. In one example, the indications of demarcations may be made based on a defined period of substantially no movement of the imaging device 102.

In one example, the image collection module 124 may further determine to maintain capturing of the images and/or frames of video data until receiving an indication that all capture of an interior of the building 300 has been completed. Capture of all of the interior of the building 300 may be determined as completed when a final junction 302 (e.g., junction 302-M) within the interior of the building 300 has been imaged or reached by the user and/or all travel paths 304 within the interior of the building 300 has been traversed and imaged. In one example, during the course of multiple segments of movement through an interior of the building 300 at and between multiple junctions 302, the image collection module 124 may determine to maintain and utilize continuous video recording during all segments of such movement, one or more individual/contiguous segments of such movement, or no segments of such movement at all. In one example, such determination may be based on one or more of defined user preferences, configuration parameters, available resources (such as storage capacity or other resources) of the imaging device 102, and a quantity or type(s) of sensor data captured during such movement, among other factors.

In addition, and in a manner similar to the guidance cues and other instructions provided during capture of images and/or frames of video data at a junction 302, the image collection module 124 may, on one example, provide guidance cues and other instructions to a user during movement of the imaging device 102 between the junctions 302. For example, the image collection module 124 may notify the user if such movement has exceeded a defined or suggested distance from the previous junction 302, or if the user is attempting to capture a next junction 302 that is determined by the image collection module 124 to be too close to the previous junction 302, or if the user is engaging in too much movement of a particular type (e.g., moving sideways rather than forward along the travel path(s) 304). Furthermore, in a manner analogous to capturing images and/or frames of video data for a junction 302, the image collection module 124 may determine to terminate capture of the images and/or frames of video data for a travel path 304 between junctions 302 for a number of reasons. For example, the image collection module 124 may determine to terminate capture of the images and/or frames of video data for a travel path 304 between junctions 302 based on a period of non-movement during or at the end of the travel path 304 or other determination that the travel path 304 is adequately captured. Further, the image collection module 124 may determine to terminate capture of the images and/or frames of video data for a travel path 304 between junctions 302 based on an explicit user request, and based on one or more defined user preferences, among other basis.

In one example, once the imaging device 102 has arrived at the second or next junction 302 (e.g., junction 302-2), the image collection module 124 may determine to terminate capture at the second junction 302-2 based on one or more of the above basis. If the images and/or frames of video data are currently being captured, the image collection module 124 may associate with the captured video one or more markers corresponding to a new junction 302. This may be based on a determined period of non-movement after the movement to the new junction 302 is completed; on a detected change in receiving sensor data indicative of lateral or vertical movement between junctions 302, or other basis. Further, this may be performed either at the time of recording or during later processing of the captured images and/or frames of video data. If the images and/or frames of video data are not currently being captured, the image collection module 124 may, in one example, automatically initiate capture of the images and/or frames of video data in response to a user requesting to begin capturing the next junction 302, or in other ways described herein. In one example, the image collection module 124 may, in one example, automatically initiate capture of the images and/or frames of video data in response to one or more interactions of the user with the image collection module 124 and/or imaging device 102, or in other ways described herein.

In a manner similar to that described with respect to junction 302-1, the image collection module 124 captures images and/or frames of video data between the first junction 302-1, and the second junction 302-2 by recording video during traversal of travel path 304-1 including, in one example, modifying imaging device 102 parameters and providing guidance cues or other instructions to the user of the imaging device 102 in order to improve the images and/or frames of video data associated with the junction 302-2 and the travel path 304-1. In one example, the image collection module 124 may receive a user request to terminate or to continue capturing images and/or frames of video data defining the interior of the building 300, such as via one or more user interactions with a graphical user interface provided by the image collection module 124 and the imaging device 102 or through other means such as, for example, user-interaction with the imaging device 102. For example, in accordance with one or more embodiments and/or defined user preferences, the image collection module 124 may determine to continue capture the images and/or frames of video data defining interior of the building 300 unless a user request indicating otherwise is received. In accordance with user-defined preferences and or based on user interactions with the imaging device 102, the image collection module 124 may automatically terminate capture of the interior of the building 300 unless and until user interaction is received indicating that one or more additional junctions 302 and linking travel paths during movement to the additional junctions 302 is to be captured.

As depicted in FIG. 3, images and/or frames of video data defining additional junctions 302 (e.g., junctions 302-3 through 302-M), as well as travel paths 304 (e.g., travel paths 304-2 through 304-M) gathered during movement between the junctions 302 may be captured by the image collection module 124 as the user moves the imaging device 102 through interior of the building 300 along the travel paths 304. The junctions 302 as defined automatically or by the user serve as decision points that may be utilized by an end user (e.g., user of the client device 142) when viewing the captured images and/or frames of video data in playback. In one example, a UI may be presented to the end user to allow the end user to select movement from junction 302-2 to one of junction 302-3 located in a second room or 302-5 located further down the hallway in which junction 302-2 is located. If the end user were to select movement to junction 302-3 into the second room, the playback of the images and/or frames of video data representing travel path 304-2 may be presented to the end user via the UI. If, in contrast the end user were to select movement to junction 302-5 further down the hallway, the playback of the images and/or frames of video data representing travel path 304-3 may be presented to the end user via the UI. Similar decisions may be made by the end user via the UI at any of the junctions 302 including the action of turning around at a junction 302 to proceed in an opposite direction than most recently traveled. In this manner, the junctions 302 serve as decisions points to assist the end user in navigating within the subject space (e.g., the interior of the building 300).

Further, in the examples described herein, the end user may perform a turnaround process between junctions 302 along any point of a travel path 304. In these examples, the user may interact with the UI to turn around and face the opposite direction along the travel path 304. When such instructions are received, and the user moves the viewing past 180 degrees (e.g., plus or minus 90 degrees) from the forward facing direction to the rear facing direction and vice versa, the present systems and methods cause a forward-facing 360 degree image to stop being displayed or otherwise transition to a rear-facing 360 degree image to display an opposite perspective of the travel path 304 than previously being viewed.

Upon conclusion of capturing the images and/or frames of video data, the image collection module 124 may determine to terminate the capture of the interior of the building 300 in response to, for example, a user request or user input. While the sequence of junctions 302 and associated travel paths 304 do not include any overlap in this example, one example of capture of the images and/or frames of video data may include one or more overlapping portions. For example, a portion of a first travel path 304 may cross another portion of another travel path 304. This may be the case in instances where one junction 302 is the same as or overlaps with another junction 302, such as where a loop in travel occurs in which the last junction 302-M is the same as the first junction 302-1 or other junction 302. Similarly, in one example, the sequence of junctions 302 may be traveled in a continuous manner. In one example, a non-contiguous path may also be performed by the user. For example, the user may stop after travelling from junctions 302-1 through 302-5, and complete the sequence by resuming at junction 302-7 and returning back to junction 302-5 along the intervening portion of the travel path 304 resulting in a different order of junctions 302 for the sequence than the one shown in FIG. 3, whether substantially immediately or after an intervening period of time has passed.

In one example, either immediately upon terminating the capture of the images and/or frames of video data defining the interior of the building 300 or at a later time, the frame matching module 126, 216 and/or the navigation module 128, 218 of the imaging device 102 and/or the server(s) 104 may be executed by their respective processor(s) 116, 208 to determine a first segment in the first series of frames that matches a second segment in the second series of frames of the captured images and/or frames of video data to create a segmentation dataset, and generate video clip data based on the segmentation data. The video clip data defines a series of video clips. The frame matching module 126, 216 and/or the navigation module 128, 218 of the imaging device 102 and/or the server(s) 104 may further be executed to perform other data processing as described herein. The output of the frame matching module 126, 216 and/or the navigation module 128, 218 may include, for example a series of video clips that may be provided to the client device 142 to allow the series of video clips to be presented in a UI 160 displayed on a display device 158.

Various operations may be performed on the images and/or frames of video data captured by the imaging device 102 as part of generating the series of video clips. Non-limiting examples of such operations include sharpening, exposure modification, cropping, integration of multiple exposures, deblurring including compensating for detected motion blur, and selective discarding of particular video frames including discarding frames based on a determination that such frames are to be normalized, are out of focus, are over- or under-exposed, are duplicative of other frames, or based on other criteria. Once the images and/or frames of video data captured by the imaging device 102 are modified in accordance with the operations described above, the resulting data is stored by the imaging device 102 and/or the server(s) 104 in their respective data stores 130, 224 as described herein. In one example, the data defining the images and/or frames of video data captured by the imaging device 102 (modified or unmodified) may be stored in the data stores 130, 224 in association with any navigation data or components such as positions of the junctions 302 and travel paths 304 in order to provide for the presentation of the images and/or frames of video data in a navigable manner.

Further, in one example and as mentioned above, analysis of the linking information corresponding to each segment of travel path 304 may be performed in order to determine relative positional information between at least successive pairs of junctions 302 along that travel path 304. For example, acceleration data defining orientation of the imaging device 102 including, for example, pitch, roll, and yaw corresponding to each such segment (e.g., images and/or frames of video data captured between the junctions 302) may be analyzed to determine, for example, a relative location of the second junction 302-2 with respect to previous, first junction 302-1 (and vice versa), with the first junction 302-1 and the second junction 302-2 being a first pair of successive junctions 302. Further, analysis may be performed to determine a relative location of the third junction 302-3 with respect to the previous, second junction 302-2 (and vice versa), with the second junction 302-2 and the third junction 302-3 being a second pair of successive junctions 302; and so on.

In one example, additional sensor data provided by the sensor(s) 164 of the imaging device 102 may be considered during the above-described analysis. For example, for an interior of a building 300 encompassing multiple floors or other elevations, in addition to analyzing vertical acceleration data to determine a relative vertical distance between junctions 302, the present systems and methods may additionally make such determination based on available altimeter data, gyroscopic data, etc.

Further, recorded images and/or frames of video data captured as part of the linking information or as part of capturing a particular junction 302 may be analyzed as part of determining the relative positional information. For example, individual video frames within separate segments of captured images and/or frames of video data corresponding to images and/or frames of video data captured from separate junctions 302, may be analyzed to determine similarities between frames. For example, one or more images and/or frames of video data captured as part of capturing junction 302-5 may be compared with one or more additional images and/or frames of video data captured as part of capturing junction 302-6 as part of determining relative positional information regarding those viewing locations. While analysis of the linking information may directly result in relative positional information between successive junctions 302 along travel path 304 (e.g., between the fourth junction 302-4 and the fifth junction 302-5, or the seventh junction 302-7 and $M^{th}$ junction 302-M), a full analysis of such linking information may indirectly result in the present systems and methods being able to determine relative positional information between additional junctions 302 as well.

Various criteria may be utilized by the present systems and methods when determining primary component images for the images and/or frames of video data, including as non-limiting examples: a component image that includes a view of a quantity of other junctions 302 within the interior of the building 300; a component image determined to be of higher quality than other component images within the captured images and/or frames of video data (e.g., based on a depth of field, exposure, lighting quality, or other attribute); among other primary component image determinations and basis. In this manner, selection of a primary component image may be unrelated to the sequence of images and/or frames of video data originally captured. In one example, multiple primary component images may be selected from the images and/or frames of video data in order to reflect a respective direction from which a viewer might arrive at the corresponding junction 302 from other junctions 302 within the interior of the building 300. With reference to FIG. 1A, for example, the present systems and methods may determine to select a first primary component image for the fifth junction 302-5 that corresponds to the perspective of a viewer arriving from the first junction 302-1 and the fourth junction 302-4 (e.g., an image and/or frame of video data captured while the imaging device 102 was facing approximately away from the fourth junction 302-5), and may determine to select a second primary component image that corresponds to the perspective of a viewer arriving from the sixth junction 302-6 (e.g., an image and/or frame of video data captured while the imaging device 102 was facing approximately toward the wall of the room in the direction of junction 302-4).

As mentioned above, the capture, processing, storage, and provision of the image and/or frame of video data may be and the determination of orientation, acceleration, position, and other data defining the position and state of the imaging device 102 may be performed locally by the processor(s) 116 of the imaging device 102 via the image collection module 124 executing in memory 118 of the imaging device 102. In one example, some or all of the above-described processing may be performed by the server(s) 104 executing their respective computing resources as described herein. In this manner, the imaging device 102 and/or the server(s) 104 may be utilized to perform processes associated with the capture, processing, storage, and provision of the image and/or frame of video data.

Having described the above systems and methods, the processes associated with the capture, processing, storage, and provision of the image and/or frame of video data will now be described in more detail. In practice, a user may capture a single set of images and/or frames of video data defining an entirety of the subject space (e.g., the interior of the building 300) or may capture a number of sets of images and/or frames of video data defining a corresponding number of portions of the subject space. During the capture, the user may consider the travel paths 304 that include portions of the subject space they desire to provide in the end-product. The user may also consider what common junctions 302 to use.

Capture of Images and/or Frames of Video Data

Further, the user may consider the fact that every image and/or frame of video data that will appear in the end-product may include both a forward and back segment. For example, if the user is moving from junction 302-2 to junction 302-5 down a hallway with the imaging device 102 (e.g., the image sensor(s) 114 of the imaging device 102) facing in the direction of junction 302-5, at some point in the capture process, the user will need to capture the same hallway, but walking from junction 302-5 to junction 302-2 with the imaging device 102 facing in the direction of junction 302-2. In one example, the imaging device 102 may include a single 360°×360° video camera. In this example, the user may need to or be requested to capture the same space as they travel between two separate junctions 302 in both a forward and backward direction (e.g., from junction 302-2 to junction 302-5 in a first direction and from junction 302-5 to junction 302-2 in a second direction).

In one example, the imaging device 102 may include two 360°×360° video cameras with a first 360°×360° video camera mounted on a front of the imaging device 102 and a second 360°×360° video camera mounted on a back of the imaging device 102 such that the two 360°×360° video cameras capture 360°×360° images from opposite sides of the imaging device 102. In this example, the user may need to only traverse the travel paths 304 a single time and may use the 360°×360° video camera mounted on a back of the imaging device 102 to capture the images and/or frames of video data that would have been captured when the user traverses the travel path 304 in an opposite direction from an initial direction of traversal.

In one example, the imaging device 102 may convert a number of fish-eye frames (e.g., frames captured via a fisheye lens or other ultra-wide-angle lens that produces strong visual distortion intended to create a wide panoramic or hemispherical image) into an equilateral panorama. This conversion of the fish-eye frames to equilateral panoramas may be performed by executing the frame matching module 126, 216 and/or the navigation module 128, 218 of the imaging device 102 and/or the server(s) 104, respectively.

Further, the images and/or frames of video data may be captured at a frame rate that is high enough relative to the walking speed of the user in which between 50% and 95% of the frames may be dropped in the final conversion process in order to achieve a normalized pace of movement. In one example, the images and/or frames of video data may be captured at a frame rate that is high enough relative to the walking speed of the user in which approximately 75% of the frames may be dropped in the final conversion process in order to achieve a normalized pace of movement.

Mapping

The captured images and/or frames of video data may be retained at the imaging device 102 and/or uploaded to the server(s) 104, and a first phase of computation associated with the captured images and/or frames of video data may occur. In one example, visual simultaneous localization and mapping (VSLAM) processing may be used to conduct the mapping of the captured images and/or frames of video data with respect to the subject space (e.g., the building 300) and the with respect to one another. Simultaneous localization and mapping (SLAM) is a computational problem of constructing or updating a map of subject space (e.g., interior of the building 300) while simultaneously keeping track of the location of, for example, the imaging device 102 within the subject space. The software, firmware, and/or hardware supporting the VSLAM process may include open source and/or proprietary VLASM computing resources. Further, the VSLAM process may utilize data obtained from one or more of the image sensor(s) 114 and/or sensor(s) 164 to assist in the processing described herein in order to, for example, derive the pitch, roll, and yaw as well as other orientation data such as direction, distance, and position in space of frames of video with respect to one another. Thus, VSLAM may utilize a number of different types of sensors (e.g., the image sensor(s) 114 and/or sensor(s) 164). In one example, the image sensor(s) 114 and/or the sensor(s) 164 may provide a number of sensor streams that may be taken into consideration in a sensor fusion process to obtain a more precise and/or more accurate estimate of how the imaging device 102 is moving within the subject space and how the images and/or frames of video data are matched within another. Sensor fusion processing may include provisioning of sensor inputs into a processing device or system such as an artificial intelligence (AI) and/or natural learning computing system that is capable of combining relevant portions of data obtained from the image sensor(s) 114 and/or the sensor(s) 164 to make determinations and process the data as described herein.

VSLAM algorithms may include sparse methods that match feature points of images and use algorithms such as parallel tracking and mapping (PTAM) and ORB-SLAM (a feature-based monocular SLAM algorithm). Dense methods may utilize the overall brightness of images and use algorithms such as dense tracking and mapping (DTAM), large-scale direct SLAM (LSD-SLAM), direct sparse odometry (DSO), and semi-direct visual odometry (SVO). In one example, the VSLAM algorithm may be included as at least part of the frame matching module 126, 216 and/or the navigation module 128, 218 of the imaging device 102 and/or the server(s) 104. The VSLAM algorithm(s) may estimate sequential movement that is, in turn, used to determine a first segment in the first series of frames that matches a second segment in the second series of frames to create a segmentation dataset. The output of the execution of the VSLAM algorithm includes the mapping data 138, 232 within the data store 130, 224 of the imaging device 102 and/or the server(s) 104. Further, the VSLAM algorithm may be used to derive the pitch, roll, and yaw as well as other orientation data such as direction, distance, and position in space of frames of video with respect to one another. In this manner, the VLSAM algorithm assists in mapping the frames of video and creating the mapping data 138, 232.

The mapping data 138, 232 may include data defining a relative location (e.g., expressed in x, y, z coordinates) and angle (roll, pitch, yaw) of a number of images and/or frames of video data. Thus, orientation, acceleration, position, and other data defining the position and state of the imaging device 102 within the subject space (e.g., interior of the building 300), and other environmental data related to the imaging device 102 may be captured, processed and/or stored in association with the imaging device 102 and the images and/or frames of video data captured thereby. The mapping data may be stored in any database including within the data store 130, 224 of the imaging device 102 and/or the server(s) 104 as mapping data 138, 232 that references and/or is associated with the images and/or frames of video data.

Segmentation

Once the images and/or frames of video data and mapping data 138, 232 are captured and stored, a number of processes may be executed to obtain segmentation data 134, 228 that defines a segmentation dataset. The mapping data 138, 232 may be analyzed by, for example, execution of the frame matching module 126, 216 and/or the navigation module 128, 218 of the imaging device 102 and/or the server(s) 104 including the VSLAM algorithm to determine segments in the images and/or frames of video data that match in reverse relation to each other. For example, when the user travels from a first junction 302 (e.g., 302-2) to a second junction 302 (e.g., 302-5) via a travel path 304 (e.g., 304-3) within the subject space (e.g., the interior of the building 300), and then moves in the opposite direction from the second junction 302 (e.g., 302-5) to the first junction 302 (e.g., 302-2) via, again, the travel path 304 (e.g., 304-3), the segments in the images and/or frames of video data captured in the forward direction along the travel path (e.g., 304-3) may be matched with the images and/or frames of video data captured in the backward or reverse direction along the travel path (e.g., 304-3). In this manner, the matching of images and/or frames of video data in reverse relation to each other provides for displayable video (e.g., displayable via the execution of the user interface display module 156 presented on the UI 160 of the display device 158 of the client device 142) that is relatively smoother in movement as the user virtually moves from one junction 302 to another junction 302. The matching of the images and/or frames of video data in reverse relation to each other fills in spaces between video segments and provides the end user with a more realistic feel when they move about the subject space as virtually presented in the UI 160.

By executing the frame matching module 126, 216 and/or the navigation module 128, 218 of the imaging device 102 and/or the server(s) 104, the mapping data 138, 232 as described above may be processed to derive individual frame location data and angle data from the captured images and/or frames of video data.

The frame matching module 126, 216 and/or the navigation module 128, 218 of the imaging device 102 and/or the server(s) 104 may perform a best guess as to which segments of the images and/or frames of video data to use and where to crop the ends of those segments based on a number of pre-determined image processing thresholds. In one example, the number of pre-determined image processing thresholds may include any value based on, for example, a length of the segments, the number of frames included in the segments, a speed of movement of the imaging device 102 through the subject space that may require dropping or removing of a number of frames for matching purposes, other factors, and combinations thereof.

Further, the frame matching module 126, 216 and/or the navigation module 128, 218 of the imaging device 102 and/or the server(s) 104 may apply additional junction thresholds to collapse nearby junction points and eliminate duplicate closely overlapping segments. The junction thresholds may include any value based on, for example, distance between junctions 302 and/or travel paths 304, size of the subject space (e.g., the interior of the building 300) with relation to the junctions 302 and/or travel paths 304, other factors, and combinations thereof.

Further, the frame matching module 126, 216 and/or the navigation module 128, 218 of the imaging device 102 and/or the server(s) 104 may be executed to identify evenly-spaced frames within the images and/or frames of video data to obtain frames that depict normalized travel within the subject space and along the travel paths 304 and at the junctions 302. This segmentation dataset may then be stored in, for example, the data stores 130, 224 of the imaging device 102 and/or the server(s) 104 as the segmentation data 134, 228. The segmentation data 134, 228 may be associated with the original images and/or frames of video data collected by the imaging device 102.

Clip Building

The frame matching module 126, 216 and/or the navigation module 128, 218 of the imaging device 102 and/or the server(s) 104 may be executed to build or create a plurality of video clips. The segmentation dataset defined by the segmentation data 134, 228 stored in the data stores 130, 224 of the imaging device 102 and/or the server(s) 104 may be used to break apart the original images and/or frames of video data, and create a series of new video clips. In one example, a number of frames may be dropped from among the images and/or frames of video data in order to normalize the pace of the movement of the imaging device 102 within the subject space during capture of the images and/or frames of video data. Further, a number of frames may be dropped from among the images and/or frames of video data in order to eliminate pauses and overlaps in the travel throughout the subject space as perceived in the final version displayed to a user of the client device 142 via the UIs 160 and display device 158.

The video clips may be stored as video clip data 136, 230 of the data stores 130, 224 of the imaging device 102 and/or the server(s) 104, respectively. In one example, because sound may not be relevant to the presentation of the video clips, the video clips defined by the video clip data 136, 230 may be built without audio. Not including audio data with the video clips may reduce the size of the data files, improve download times between the server(s) 104 and the client device 142, and allow for the client device 142 to process the relatively smaller files without a loss in smoothness or resolution, among other advantages of not including audio data. A video clip dataset may be created based on the video clip data 136, 230. The video clip dataset may enumerate pairs of video clips, connections of the endpoints of the video clips to each other and may include data defining a relative angle of each of the frames in the video clips.

In one example, the video clip data 136, 230 defining the video clip dataset may be uploaded to the client device 142 for viewing. In one example, a web-based and/or public video display system may be used to display and allow for user interaction with the video clip dataset. In one example, a web-based or online virtual tour of the subject space may be provided by presenting within a webpage the video clip data 136, 230 defining the video clip dataset within an online video player and/or interactive web elements to allow the user to virtually navigate the subject space. In one example, the web-based or online virtual tour of the subject space may include, for example, sound effects, music, narration, text, and other multimedia elements along with the presentation of the video clip data 136, 230 defining the video clip dataset. Further, the web-based or online virtual tour of the subject space may include user-interactive navigation elements such as, for example, panning toggles, zooming toggles, and directional motion toggles to allow the user to virtual tour the subject space. Thus, with the inclusion of the video clip data 136, 230 defining the video clip dataset described herein, the virtual tour of the subject space may present the user with a feel of both a video tour where video is presented rather than still images, while still providing for a 3D virtual tour feel with regard to the manner in which the user may navigate the subject space virtually.

In one example, the video clip data 136, 230 defining the video clip dataset may be distributed by the imaging device 102 and/or the server(s) 104 and presented via a SaaS platform provided via a network such as the Internet. In one example, the SaaS may include an online video platform (OVP) that provides a video hosting service, enables for the imaging device 102 and/or the server(s) 104 to upload, convert, store and play back or otherwise present the video clip data 136, 230 defining the video clip dataset on the Internet. In one example, the generation and presentation of the video clip data 136, 230 defining the video clip dataset via the OVP may generate revenue for any entity involved in the presentation of the video clip data 136, 230 including, for example, an operator and/or owner of the imaging device 102, an operator and/or owner of the server(s) 104, any entities that employ individuals utilizing the imaging device 102 and/or server(s) 104, other entities, and combinations thereof. In one example, the video clip data 136, 230 may be uploaded via a hosting service of the OVP website, mobile or desktop application, or other API. In one example, the video host (e.g., the OVP) may store the video clip data 136, 230 on a number of servers associated with the OVP. In one example, the OVP may include the Vimeo™ video hosting, sharing, and services platform developed and distributed by IAC.

Editing

In one example, a user interface and associated display device (e.g., similar to the display device 158 and UIs 160 of the client device 142) may be provided at the imaging device 102 and/or the server(s) 104 to allow a user to perform adjustments to the video data 132, 226, the segmentation data 134, 228, the video clip data 136, 230, and/or the mapping data 138, 232 stored in the data stores 130, 224 of the imaging device 102 and/or the server(s) 104, respectively. The adjustments may include fine-tune adjustments to any of this data. In one example, a user of the imaging device 102 and/or the server(s) 104 may adjust the segmentation data 134, 228 used to define the video clip data 136, 230 including selection of the segmentation data 134, 228 selected and used to produce the video clip data 136, 230, to adjust the endpoints defined within segmentation data 134, 228, other adjustments to the segmentation data 134, 228, and combinations thereof. In making these adjustments, the user may interact with the UI of the imaging device 102 and/or server(s) 104. In one example where the user does make adjustments to the segmentation data 134, 228, the video clip building process described herein will be re-performed in order to incorporate and reflect the adjustments made to the segmentation data 134, 228 in the video clip data 136, 230.

Display

As mentioned above, a UI 160 may be provided to a user of the client device (e.g., an end user). The video clip data 136, 230 defining the video clip dataset may be loaded and used to browse or tour the subject space. A web-based viewer such as, for example, the above-described OVP, may convert the equilateral panoramas derived from the images and/or frames of video data into a view of the subject space (e.g., the interior of the building 300). In one example, the user may change an angle of view and/or may move forward through the space along the travel paths 304 as presented in the web-based viewer.

The user may also adjust the view and direction of travel within the web-based viewer by manipulating the inputs of the web-based viewer to turning around in the virtual space. In this instance, the web-based viewer may, in response to receiving the instruction to turn around in the virtual space, swap to a reverse video clip that has been matched with the forward video clip within the video clip data 136, 230 to avoid showing the user of the imaging device 102 (e.g., photographer of the subject space) to the end user. Stated another way, the segmentation dataset defined by the segmentation data 134, 228 includes paired forward and reverse segments and corresponding video clips defined by the video clip data 136, 230 includes paired forward and reverse video clips. When the end user (e.g., the user of the client device 142) turns the virtual view of the subject space via the OVP past 180 degrees (e.g., plus or minus 90 degrees) from the forward facing direction to the rear facing direction and vice versa, the OVP may switch to the paired segment and/or video clip. Viewing past 180 degrees (e.g., plus or minus 90 degrees) from the forward facing direction to the rear facing direction and vice versa causes the OVP to display an opposite perspective of the travel path 304 than previously being viewed. This ensures that the photographer (e.g., user of the imaging device 102) is always out of view within the presented video clips and prepares the OVP to move in the reverse direction down the travel path 304 based on user input at a user interface of the OVP.

Further, provisioning of the reverse video clip that has been matched with the forward video clip within the video clip data 136, 230 allows the user to virtually move back down the same hallway by moving forward in the opposite direction. In this manner, it is never explicitly apparent to the end user that video clips are being used to store the series of equilateral images that comprise the travel path. Further, in this manner, it is never made apparent to the end user that there are multiple video clips that are being switched between as the end user navigates the virtual space. To the end user, navigation of the virtual space created by the presentation of the video clip data 136, 230 will present a sense that the end user is walking through the subject space in a fluid, unabridged, and/or non-disjointed manner much like movement within a virtual space of a first-person video game allows a player to move, but with the subject space (e.g., a real physical space) being portrayed. Further, to the end user, navigation of the virtual space created by the presentation of the video clip data 136, 230 will lack any disjointed views of the subject space since no images are morphed or stretched, and, instead frames exist within the video clip data 136, 230 to visually represent all angles of view and directions of travel.

Figure 4:
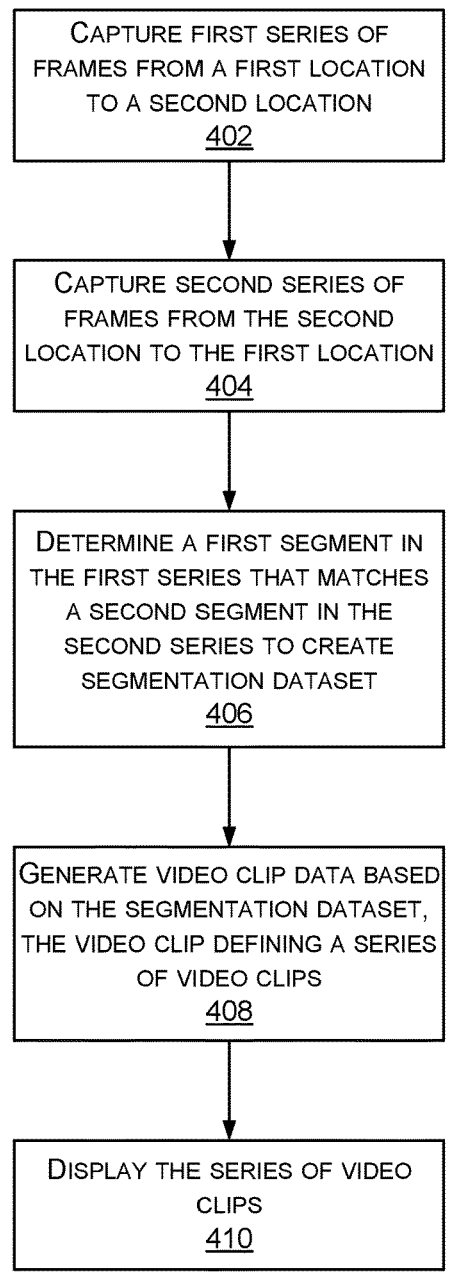
FIG. 4 illustrates a flow diagram of an example method of imaging, processing, and presenting an interactive display of a space, according to an example of the principles described herein.

FIG. 4 illustrates a flow diagram of an example method 400 of imaging, processing, and presenting an interactive display of a space, according to an example of the principles described herein. The method 400 may include, at 402 and with the imaging device 102, capturing a first series of frames as the imaging device 102 travels from a first location to a second location within a space. For example, the imaging device may be traveling from a first one of the junctions 302 to a second one of the junctions 302 via at least one travel path 304.

At 404, the imaging device 102 may capture a second series of frames as the imaging device 102 travels from the second location to the first location. Traveling between the first and second locations may be performed via user interaction where a photographer or other user of the imaging device 102 moves the imaging device 102 through the subject space along the travel paths 304.

The imaging device 102 and/or the server(s) 104 may, at 406, determine a first segment in the first series of frames that matches a second segment in the second series of frames. This is performed in order to create a segmentation dataset as defined by the segmentation data 134, 228. The segmentation data 134, 228 created at 406 may be stored in the data stores 130, 224 of the imaging device 102 and/or the server(s) 104.

At 408, the imaging device 102 and/or the server(s) 104 may generate video clip data 136, 230 based on the segmentation dataset defined by the segmentation data 134, 228. The video clip data 136, 230 may define a series of video clips. Further, the video clip data 136, 230 may be stored in the data stores 130, 224 of the imaging device 102 and/or the server(s) 104.

Using a video playback system such as, for example, the OVP, the series of video clips defined by the video clip data 136, 230 may be provided to a device such as the client device 142 and allowed to be displayed. As mentioned above, the series of video clips may include a number of interactive elements including junctions 302 and travel paths 304 that allow the OVP to navigate based on input from the user of the client device 142. Further, as mentioned above, the OVP may display a number of navigation options to allow the user of the client device 142 to virtually navigate the subject space including, for example, panning, zooming, moving in a number of directions based on the junctions 302 and travel paths 304.

Figure 5:
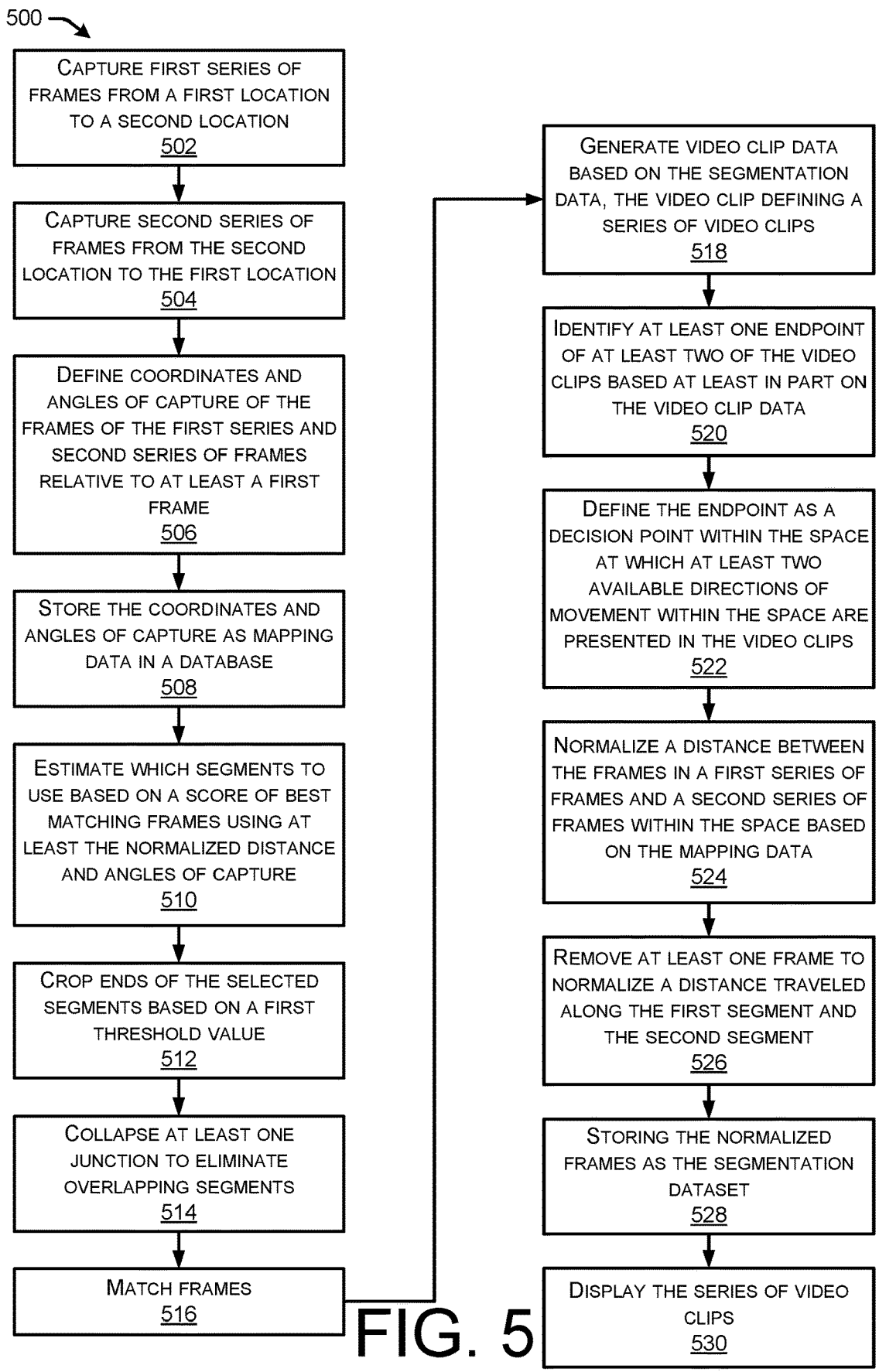
FIG. 5 illustrates a flow diagram of an example method of imaging, processing, and presenting an interactive display of a space, according to an example of the principles described herein.

FIG. 5 illustrates a flow diagram of an example method 500 of imaging, processing, and presenting an interactive display of a space, according to an example of the principles described herein. The method 500 may include, at 502 and with the imaging device 102, capturing a first series of frames as the imaging device 102 travels from a first location to a second location within a space. For example, the imaging device may be traveling from a first one of the junctions 302 to a second one of the junctions 302 via at least one travel path 304. Stated another way, the imaging device 102 may capture a first series of frames as the imaging device 102 travels in a forward direction. At 504, the imaging device 102 may capture a second series of frames as the imaging device 102 travels from the second location to the first location. Traveling between the first and second locations may be performed via user interaction where a photographer or other user of the imaging device 102 moves the imaging device 102 through the subject space along the travel paths 304. Stated another way, the imaging device 102 may capture a second series of frames as the imaging device 102 travels in a backward direction along the same travel path as the forward direction of travel.

During or after capturing of the images and/or frames of video data at 502 and 504, the image collection module 124 and/or the frame matching module 126 may be executed by the processor(s) 116 to define a number of coordinates and a number of angles of capture of a number of frames in the first series of frames and the second series of frames relative to at least a first frame of the number of frames. As described herein, metadata defining the pitch, roll, and yaw as well as other orientation data such as direction, distance, and position in space may be captured along with the images and/or frames of video data or may be derived via the execution of VSLAM processing in later processing such as mapping as described herein. Thus, at 506, the imaging device 102 and/or server(s) 104 may define a number of coordinates and angles of capture of the images and/or frames of video data of the first series and second series relative to at least a first frame captured by the imaging device 102. The first image and/or frame of video data captured by the imaging device 102 when imaging the subject space (whether at the outset such as at the first junction 302-1 and/or at each individual junction 302 after starting the imaging at the junctions 302) may serve as a basis from which all other images and/or frames of video data are oriented. For example, the metadata defining the pitch, roll, and yaw as well as other orientation data such as direction, distance, and position in space may be captured along with the images and/or frames of video data. This metadata may be associated with the images and/or frames of video data as a whole, with segments or video clips thereof, with individual frames of the images and/or frames of video data, and combinations thereof. This metadata associated with the first image and/or frame of video data may be used to orient in space the remaining images and/or frames of video data. This assists in the matching of forward-facing images with backward-facing images as described in more detail herein. Thus, the metadata may be used to assist in the matching of segments of the images and/or frames of video data. The metadata may also be used to compensate for the viewing angles of resulting video clips created using the present systems and methods during playback to provide a smooth viewing experience.

The metadata including the coordinates and angles of capture of the images and/or frames of video data of the first series and second series may be stored in the data store 130, 224 of the imaging device 102 and/or the server(s) 104 at 508. Specifically, the metadata may be stored as mapping data 138, 232 within the data store 130, 224 of the imaging device 102 and/or the server(s) 104 at 508. As described above in connection with 406 of FIG. 4, a first segment in the first series of frames that matches a second segment in the second series of frames may be determined. This is performed in order to create a segmentation dataset as defined by the segmentation data 134, 228 and as outlined at 524 through 528 described below.

At 510, the imaging device 102 and/or the server(s) 104 may execute the frame matching module 126, 216 and/or the navigation module 128, 218 to estimate which of a number of segments defined by the segmentation data 134, 228 to utilize from within the first series of frames and within the second series of frames based at least in part on a score of best matching frames using at least the normalized distance and angles of capture between the first series of frames and the second series of frames to obtain selected segments. In one example, the frame matching module 126, 216 and/or the navigation module 128, 218 of the imaging device 102 and/or the server(s) 104 may perform a best guess as to which segments of the images and/or frames of video data to use based on a number of pre-determined image processing thresholds as described above. In one example, the number of pre-determined image processing thresholds may include any value based on, for example, a length of the segments, the number of frames included in the segments, a speed of movement of the imaging device 102 through the subject space that may require dropping or removing of a number of frames for matching purposes, other factors, and combinations thereof. In one example, the frame matching module 126, 216 and/or the navigation module 128, 218 of the imaging device 102 and/or the server(s) 104 may perform a best guess as to which segments of the images and/or frames of video data to use based on a score given for any value based on, for example, the length of the segments, the number of frames included in the segments, the speed of movement of the imaging device 102 through the subject space that may require dropping or removing of a number of frames for matching purposes, other factors, and combinations thereof. Thus, the present systems and methods may utilize a number of threshold or scores to determine best matching frames within the segments.

Further, at 512, the frame matching module 126, 216 and/or the navigation module 128, 218 may be executed by the imaging device 102 and/or the server(s) 104 to crop ends of the selected segments based on a first threshold value. Cropping the ends of selected segments from the number of segments (e.g., segmentation dataset) defined by the segmentation data 134, 228 allows for better matching of the segments and reduces files size resulting in a reduction in processing and data storage requirements and a decrease in computing resources. In one example, the cropping at 512 may include exclusion and/or deletion of a number of the images and/or frames of video data captured in the original or processed versions of the images and/or frames of video data.

The frame matching module 126, 216 and/or the navigation module 128, 218 may be execute by the imaging device 102 and/or the server(s) 104 at 514 in order to collapse at least one junction 302 to eliminate overlapping segments (e.g., travel paths 304) within the subject space as identified by the present systems and methods. In one example, the imaging device 102 and/or the server(s) 104 may apply additional or second thresholds referred to herein as junction thresholds to collapse nearby junctions 302 and eliminate duplicate closely overlapping travel paths 304. The junction thresholds may include any value based on, for example, distance between junctions 302 and/or travel paths 304, size of the subject space (e.g., the interior of the building 300) with relation to the junctions 302 and/or travel paths 304, other factors, and combinations thereof. Collapsing the junctions 302 and/or travel paths 304 reduces files size of the data associated with or defining the junctions 302 and/or travel paths 304 resulting in a reduction in processing and data storage requirements and a decrease in computing resources. In one example, the collapsing at 514 may include exclusion and/or deletion of data defining the junctions 302 and/or travel paths 304.

At 516, individual images and/or frames of video data within the segmentation dataset defined by the segmentation data 134, 228 may be matched based on the outcomes of 506 through 514. The matched segmentation data 134, 228 may produce an output to an end user (e.g., user of the client device 142) that is visually appealing and provides a more complete understanding and appreciation for the subject space (e.g., the interior of the building 300). The matched segmentation data 134, 228 may allow the end user to perform a turnaround process virtually within a UI 160 of a display device 158 between junctions 302 along any point of a travel path 304. In these examples, the user may interact with the UI 160 to turn around and face the opposite direction along the travel path 304. When such instructions are received, and the user moves the viewing past 180 degrees (e.g., plus or minus 90 degrees) from the forward facing direction to the rear facing direction and vice versa, the present systems and methods cause a forward-facing 360 degree image to stop being displayed or otherwise transition to a rear-facing 360 degree image to display an opposite perspective of the travel path 304 than previously being viewed. Thus, provisioning of the reverse video clip that has been matched with the forward video clip within the video clip data 136, 230 allows the user to virtually move in the opposite direction. With the matched segmentation data 134, 228, the present systems and methods provide a virtual environment in which it is never made apparent to the end user that there are multiple video clips that are being switched between as the end user navigates the virtual space. To the end user, navigation of the virtual space created by the presentation of the video clip data 136, 230 that are created based on the matched segmentation data 134, 228 provides the user with a sense that the end user is walking through the subject space in a fluid, unabridged, and/or non-disjointed manner much like movement within a virtual space of a first-person video game allows a player to move, but with the subject space (e.g., a real physical space) being portrayed. Further, to the end user, navigation of the virtual space created by the presentation of the video clip data 136, 230 will lack any disjointed views of the subject space since no images are morphed or stretched, and, instead frames exist within the video clip data 136, 230 to visually represent all angles of view and directions of travel along the defined paths. In all, the user may navigate and experience the subject space virtually as if the user were actually present within the subject space.

Turning again to FIG. 5, the method 500 may include, at 518, generating video clip data 136, 230 based on the segmentation data 134, 228. The video clip data 136, 230 may define a series of video clips that may be displayed to the end user (e.g., the user of the client device 142). The video clip data 136, 230 may be stored in the data stores 130, 224 of the imaging device 102 and/or the server(s) 104.

At 520, at least one endpoint of as least two of the video clips defined by the video clip data 136, 230 may be defined based at least in part on the video clip data 136, 230. In one example, data defining the endpoints may be stored in association with and/or as part of the video clip data 136, 230. The endpoints may be used to define a number of decision points within the subject space (e.g., the interior of the building 300) at 522. Stated another way, the junctions 302 may be located at the endpoints of the video clips. In one example, data obtained by the user of the imaging device 102 regarding the commencement and termination of image capture based on automatic or user-provided input to define the junctions 302 may be used to define within the video clips where the endpoints may be included. In this manner, the junctions 302 may match with the endpoints of the video clips as defined by the video clip data 136, 230 to allow a user of the client device 142 to select a direction of virtual travel within the subject space. In one example, at 522, three endpoints may be used to define a number of decision points within the subject space including a first endpoint of a first segment (e.g., endpoint located on travel path 304-1 at junction 302-2) that enters the decision point (e.g., junction 302-2), a second endpoint that heads a second segment (e.g., endpoint located on travel path 304-2 at junction 302-2), and a third endpoint that heads a third segment (e.g., endpoint located on travel path 304-3 at junction 302-2). In one example, at least two endpoints are included at each junction 302 to allow for the user to navigate from a junction in a backwards direction from that which was previously traversed. In this manner, the endpoints serve to assist in presenting a decision point to the user as the user virtually navigates the subject space.

At 524, the distance between the frames in the first series of frames and the second series of frames within the subject space may be normalized based on the mapping data. Normalization of these distances may be performed through execution of the frame matching module 126, 216 and/or the navigation module 128, 218 of the imaging device 102 and/or the server(s) 104 in order to obtain evenly-spaced images and/or frames of video data that defines normalized pace of movement through the subject space. The result of the normalization of images and/or frames of video data at 524 is the segmentation data 134, 228 described herein. Further, the segmentation data 134, 228 may be stored in the data stores 130, 224 of the imaging device 102 and/or the server(s) 104.

As part of or concurrent with the normalization of images and/or frames of video data at 524, the frame matching module 126, 216 and/or the navigation module 128, 218 of the imaging device 102 and/or the server(s) 104 may be executed to remove or drop at least one frame of the images and/or frames of video data to normalize the distance traveled along the first segment and the second segment. In one example, the first segment and the second segment may include the same segment but captured in opposite directions. The result of 524 and 526 may include normalized images and/or frames of video data that define a segmentation dataset. The segmentation data 134, 228 that defines the segmentation dataset may be stored as such in the in the data stores 130, 224 of the imaging device 102 and/or the server(s) 104 at 528.

With the video clip data 136, 230 created and stored based on 502 through 528, the video clip data 136, 230 may be provided to the client device 142 from the imaging device 102 and/or server(s) 104. In this manner, at 530, at least one, and, in one example, a series of video clips defined by the video clip data 136, 230 are allowed to be presented via execution of the user interface display module 156. The user interface display module 156 may include any proprietary or commercial software and/or firmware included as part of the software and/or firmware module(s) 154 included in the memory 152 of the client device 142, and may include an OVP such as, for example, the Vimeo™ video hosting, sharing, and services platform developed and distributed by IAC described herein. Using the UI 160 displayed on the display device 158 of the client device 142, the user may virtually navigate the subject space based on the video clips.

Figure 6:
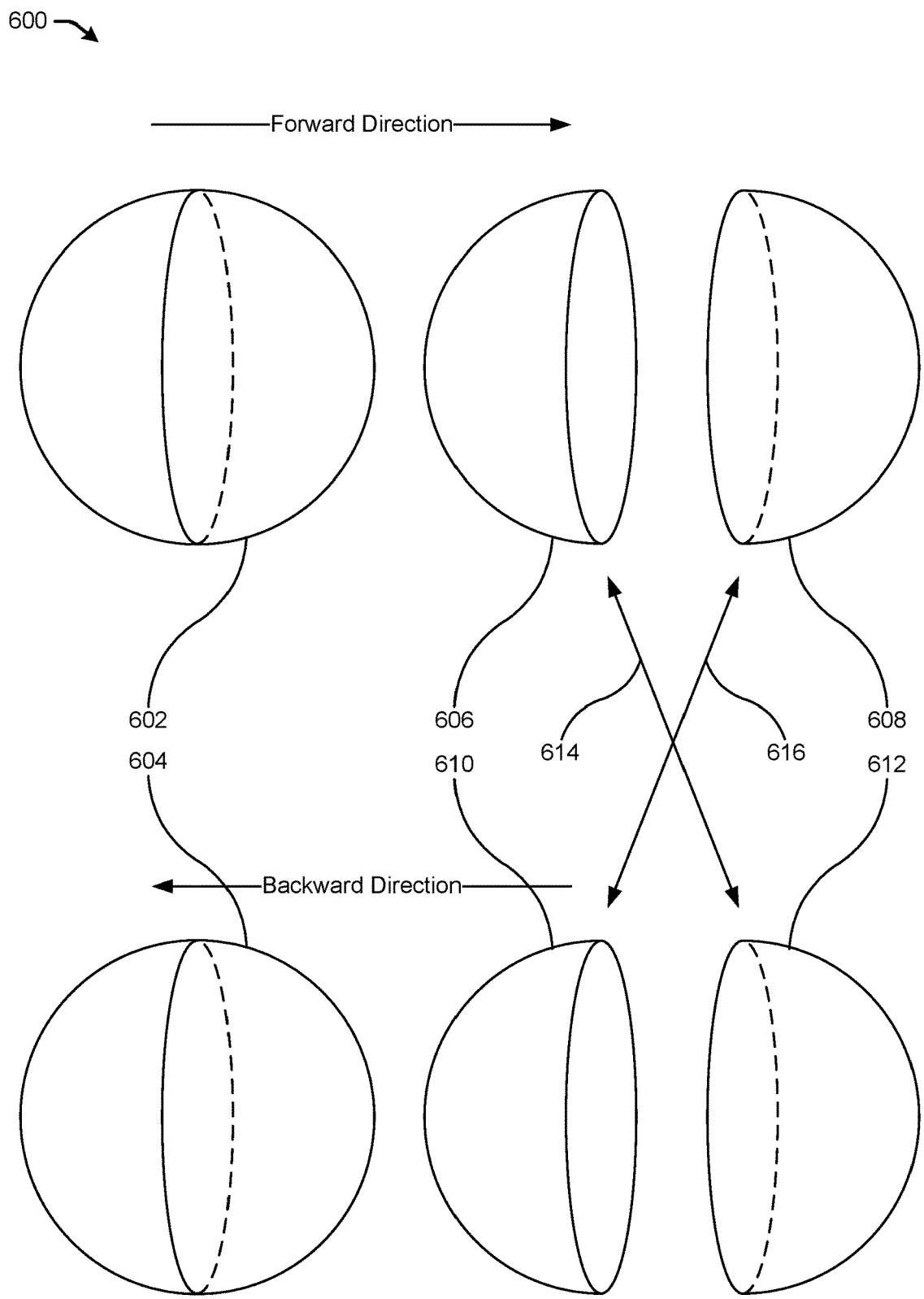
FIG. 6 illustrates a diagram of a forward and backward directional 360°×360° spheres and associated hemispheres used in matching images and/or frames of video data, according to an example of the principles described herein.

FIG. 6 illustrates a diagram 600 of a forward and backward directional 360°×360° spheres 602, 604 and associated hemispheres 606, 608, 610, 612 used in matching images and/or frames of video data, according to an example of the principles described herein. As depicted in FIG. 6 and described herein, both forward directional 360°×360° images and/or frames of video data and backward directional 360°×360° images and/or frames of video data may be captured within the subject space (e.g., the interior of the building 300) in order to provide a smoother and seamless transition when a user virtually moves within the subject space including in a backwards direction. The forward directional 360°×360° images and/or frames of video data is represented in FIG. 6 via a forward directional 360°×360° sphere 602 and the backward directional 360°×360° images and/or frames of video data is represented in FIG. 6 via a backward directional 360°×360° sphere 604. The forward directional 360°×360° sphere 602 may be captured as the user of the imaging device 102 moves within the subject space in a forward or first direction along the travel paths 304. Similarly, the backward directional 360°×360° sphere 604 may be captured as the user of the imaging device 102 moves within the subject space in a backward or second direction along the travel paths 304.

The forward directional 360°×360° sphere 602 is one of a plurality of frames within the video data 132, 226 defining the images and/or frames of video data captured by the imaging device 102 as the imaging device 102 moves in the forward direction. Thus, the forward directional 360°×360° sphere 602 is one of a plurality of frames included within a segment dataset defined by the segmentation data 134, 228. Similarly, backward directional 360°×360° sphere 604 is one of a plurality of frames within the video data 132, 226 defining the images and/or frames of video data captured by the imaging device 102 as the imaging device 102 moves in the backward direction. Thus, the backward directional 360°×360° sphere 604 is one of a plurality of frames included within a segment dataset defined by the segmentation data 134, 228.

The forward directional 360°×360° sphere 602 and the backward directional 360°×360° sphere 604 may each include a number of hemispheres including a first hemisphere 606 and a second hemisphere 608 associated with the forward directional 360°×360° sphere 602 and a third hemisphere 610 and a fourth hemisphere 612 associated with the backward directional 360°×360° sphere 604. Using the mapping processes of the VSLAM software included as part of the frame matching module 126, 216 and/or the navigation module 128, 218 of the imaging device 102 and/or the server(s) 104, the second hemisphere 608 of the forward directional 360°×360° sphere 602 facing in the forward direction may be matched with the third hemisphere 610 of the backward directional 360°×360° sphere 604 to allow for the user to virtually navigate in the forward direction down a travel path 304, and turn to view the subject space along the travel path 304 in the opposite direction. This matching of the second hemisphere 608 with the third hemisphere 610 is indicated by arrow 616. Because the second hemisphere 608 and the third hemisphere 610 are matched along with a series of frames within a segment dataset matched in a similar manner, once the user virtually views the subject space past 180 degrees (e.g., plus or minus 90 degrees) past a vertex of the second hemisphere 608, executable code will cause the view within the UI 160 to be switched to the paired third hemisphere 610 representing the opposite direction along the travel path 304. Similarly, once the user virtually views the subject space past 180 degrees (e.g., plus or minus 90 degrees) past a vertex of the third hemisphere 610, executable code will cause the view within the UI 160 to be switched to the paired second hemisphere 608 representing the opposite direction along the travel path 304.

In a similar manner, using the mapping processes of the VSLAM software included as part of the frame matching module 126, 216 and/or the navigation module 128, 218 of the imaging device 102 and/or the server(s) 104, the first hemisphere 606 of the forward directional 360°×360° sphere 602 facing in the forward direction may be matched with the fourth hemisphere 612 of the backward directional 360°×360° sphere 604 to allow for the user to virtually navigate in the backward direction down a travel path 304, and turn to view the subject space along the travel path 304 in the opposite direction. This matching of the first hemisphere 606 with the fourth hemisphere 612 is indicated by arrow 614. Because the first hemisphere 606 and the fourth hemisphere 612 are matched along with a series of frames within a segment dataset matched in a similar manner, once the user virtually views the subject space past 180 degrees (e.g., plus or minus 90 degrees) past a vertex of the first hemisphere 606, executable code will cause the view within the UI 160 to be switched to the paired fourth hemisphere 612 representing the opposite direction along the travel path 304. Similarly, once the user virtually views the subject space past 180 degrees (e.g., plus or minus 90 degrees) past a vertex of the fourth hemisphere 612, executable code will cause the view within the UI 160 to be switched to the paired first hemisphere 606 representing the opposite direction along the travel path 304. In this manner, a number of frames within the segmentation data 134, 228 may be matched to provide for the an uninterrupted, coherent, consistent, and logical depiction of the subject space. In this manner, it is never explicitly apparent to the end user that video clips created from the matched segmentation data 134, 228 are being used to store the series of equilateral images that comprise the travel path 304. Further, in this manner, it is never made apparent to the end user that there are multiple video clips that are being switched between as the end user navigates the virtual space defining the subject space (e.g., the interior of the building 300). To the end user, navigation of the virtual space created by the presentation of the video clip data 136, 230 will present a sense that the end user is walking through the subject space in a fluid, unabridged, and/or non-disjointed manner much like movement within a virtual space of a first-person video game allows a player to move, but with the subject space (e.g., a real physical space) being portrayed. Further, to the end user, navigation of the virtual space created by the presentation of the video clip data 136, 230 will lack any disjointed views of the subject space since no images are morphed or stretched, and, instead frames exist within the video clip data 136, 230 to visually represent all angles of view and directions of travel.

Figure 7:
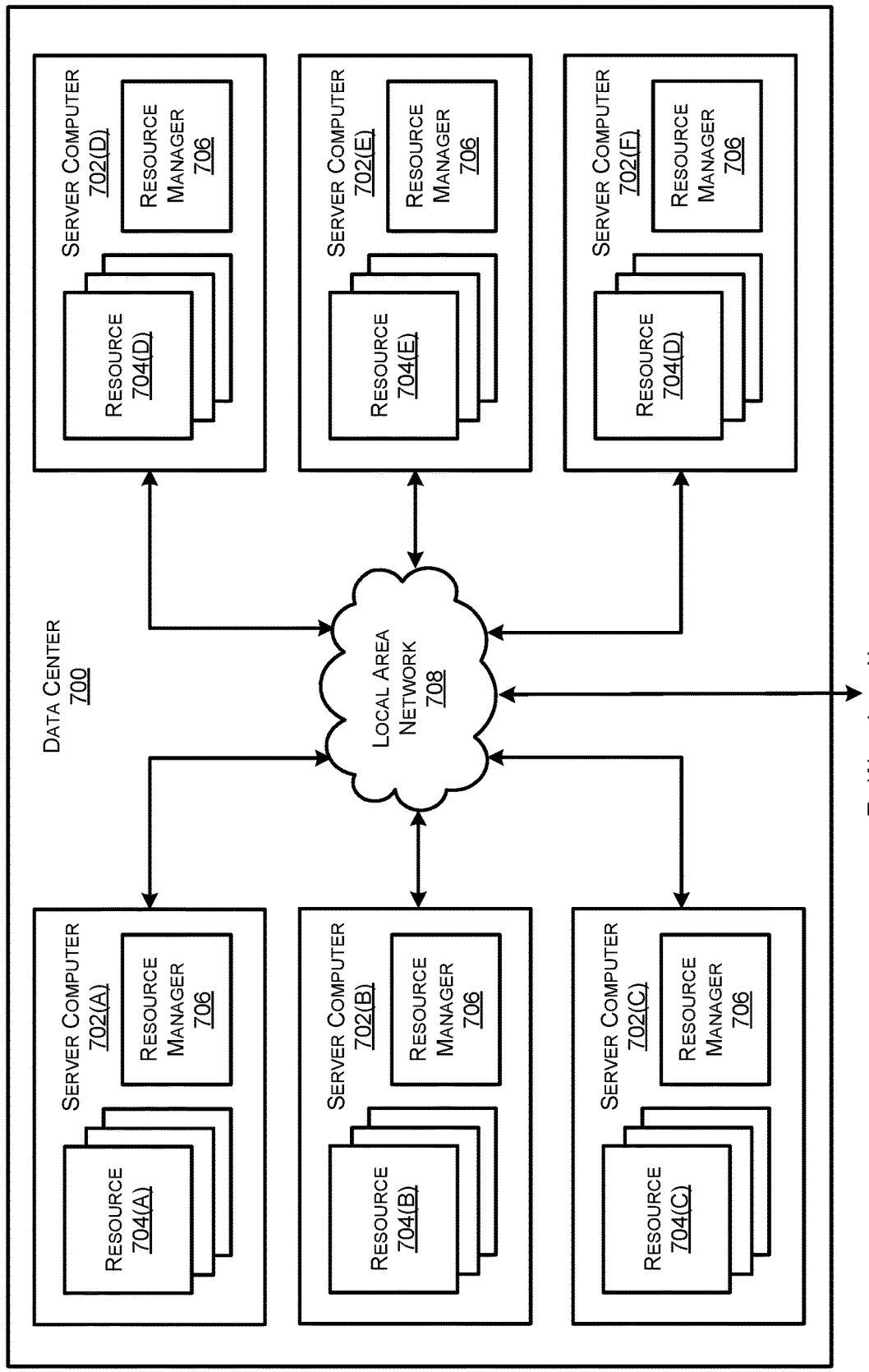
FIG. 7 illustrates a computing system diagram illustrating a configuration for a data center that may be utilized to implement aspects of the technologies disclosed herein.

FIG. 7 illustrates a computing system diagram illustrating a configuration for a data center 700 that may be utilized to implement aspects of the technologies disclosed herein. The example data center 700 shown in FIG. 7 includes several server computers 702A-702F (which might be referred to herein singularly as "a server computer 702" or in the plural as "the server computers 702") for providing computing resources. In some examples, the resources and/or server computers 702 may include, or correspond to, any type of networked device described herein. Although described as servers, the server computers 702 may comprise any type of networked device, such as servers, switches, routers, hubs, bridges, gateways, modems, repeaters, access points, etc.

The server computers 702 may be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, virtual private networks (VPNs), and others. Some of the server computers 702 may also be configured to execute a resource manager 706 capable of instantiating and/or managing the computing resources. In the case of VM instances, for example, the resource manager 706 may be a hypervisor or another type of program configured to enable the execution of multiple VM instances on a single server computer 702. Server computers 702 in the data center 700 may also be configured to provide network services and other types of services.

In the example data center 700 shown in FIG. 7, an appropriate LAN 708 is also utilized to interconnect the server computers 702A-702F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 700, between each of the server computers 702A-702F in each data center 700, and, potentially, between computing resources in each of the server computers 702. It may be appreciated that the configuration of the data center 700 described with reference to FIG. 7 is merely illustrative and that other implementations may be utilized.

In some examples, the server computers 702 and or the computing resources 704 may each execute/host one or more tenant containers and/or virtual machines to perform techniques described herein.

In some instances, the data center 700 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 704 provided by the cloud computing network may include various types of computing resources, such as data processing resources like tenant containers and VM instances, data storage resources, networking resources, data communication resources, network services, VPN instances, and the like.

Each type of computing resource 704 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 704 not mentioned specifically herein.

The computing resources 704 provided by a cloud computing network may be enabled in one example by one or more data centers 700 (which might be referred to herein singularly as "a data center 700" or in the plural as "the data centers 700). The data centers 700 are facilities utilized to house and operate computer systems and associated components. The data centers 700 typically include redundant and backup power, communications, cooling, and security systems. The data centers 700 may also be located in geographically disparate locations. One illustrative example for a data center 700 that may be utilized to implement the technologies disclosed herein is described herein with regard to, for example, FIGS. 1 through 6.

Figure 8:
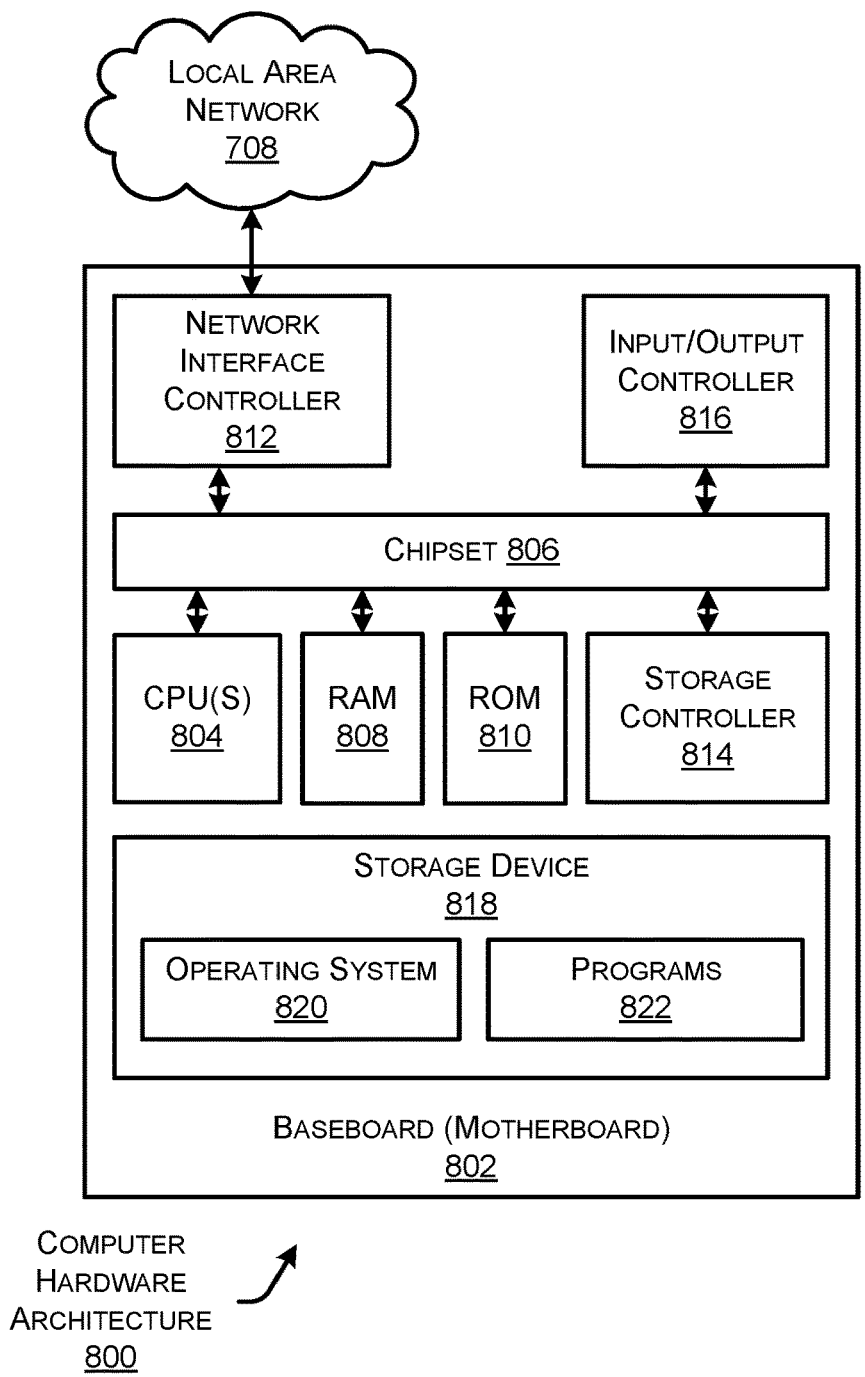
FIG. 8 illustrates a computer architecture diagram showing an example computer hardware architecture for implementing a computing device that may be utilized to implement aspects of the various technologies presented herein.

FIG. 8 illustrates a computer architecture diagram showing an example computer hardware architecture 800 for implementing a computing device that may be utilized to implement aspects of the various technologies presented herein. The computer hardware architecture 800 shown in FIG. 8 illustrates the imaging device 102, the server(s) 104, client device 142, the network 106, and/or other systems or devices associated with the imaging device 102, the server(s) 104, client device 142, the network 106 and/or remote from the imaging device 102, the server(s) 104, client device 142, the network 106, a workstation, a desktop computer, a laptop, a tablet, a network appliance, an e-reader, a smartphone, or other computing device, and may be utilized to execute any of the software components described herein. The computer 800 may, in some examples, correspond to a network device (e.g., the imaging device 102, the server(s) 104, client device 142, and/or the network 106) described herein, and may comprise networked devices such as servers, switches, routers, hubs, bridges, gateways, modems, repeaters, access points, etc.

The computer 800 includes a baseboard 802, or "motherboard," which is a printed circuit board to which a multitude of components or devices may be connected by way of a system bus or other electrical communication paths. In one illustrative configuration, one or more central processing units (CPUs) 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computer 800. The chipset 806 may further provide an interface to a computer-readable storage medium such as a read-only memory (ROM) 810 or non-volatile RAM (NVRAM) for storing basic routines that help to startup the computer 800 and to transfer information between the various components and devices. The ROM 810 or NVRAM may also store other software components necessary for the operation of the computer 800 in accordance with the configurations described herein.

The computer 800 may operate in a networked environment using logical connections to remote computing devices and computer systems through a network, such as the imaging device 102, the server(s) 104, client device 142, and/or the network 106, among other devices. The chipset 806 may include functionality for providing network connectivity through a Network Interface Controller (NIC) 812, such as a gigabit Ethernet adapter. The NIC 812 is capable of connecting the computer 800 to other computing devices within the imaging device 102, the server(s) 104, client device 142, and/or the network 106 and external to the imaging device 102, the server(s) 104, client device 142, and/or the network 106. It may be appreciated that multiple NICs 812 may be present in the computer 800, connecting the computer to other types of networks and remote computer systems. In some examples, the NIC 812 may be configured to perform at least some of the techniques described herein, such as packet redirects and/or other techniques described herein.

The computer 800 may be connected to a storage device 818 that provides non-volatile storage for the computer. The storage device 818 may store an operating system 820, programs 822 (e.g., any computer-readable and/or computer-executable code described herein), and data, which have been described in greater detail herein. The storage device 818 may be connected to the computer 800 through a storage controller 814 connected to the chipset 806. The storage device 818 may consist of one or more physical storage units. The storage controller 814 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 800 may store data on the storage device 818 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 818 is characterized as primary or secondary storage, and the like.

For example, the computer 800 may store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the storage device 818 by detecting the physical states or characteristics of one or more particular locations within the physical storage units.

In addition to the storage device 818 described above, the computer 800 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 800. In some examples, the operations performed by the imaging device 102, the server(s) 104, client device 142, the network 106, and/or any components included therein, may be supported by one or more devices similar to computer 800. Stated otherwise, some or all of the operations performed by the imaging device 102, the server(s) 104, client device 142, the network 106, and/or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 818 may store an operating system 820 utilized to control the operation of the computer 800. According to one example, the operating system 820 comprises the LINUX operating system. According to another example, the operating system comprises the WINDOWS® SERVER operating system from MICROSOFT Corporation of Redmond, Washington. According to further examples, the operating system may comprise the UNIX operating system or one of its variants. It may be appreciated that other operating systems may also be utilized. The storage device 818 may store other system or application programs and data utilized by the computer 800.

In one example, the storage device 818 or other computer-readable storage media is encoded with computer-executable instructions which, when loaded into the computer 800, transform the computer from a general-purpose computing system into a special-purpose computer capable of implementing the examples described herein. These computer-executable instructions transform the computer 800 by specifying how the CPUs 804 transition between states, as described above. According to one example, the computer 800 has access to computer-readable storage media storing computer-executable instructions which, when executed by the computer 800, perform the various processes described above with regard to FIGS. 1 through 7. The computer 800 may also include computer-readable storage media having instructions stored thereupon for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, an input/output controller 816 may provide output to a display, such as a computer monitor, a flat-panel display, a digital projector, a printer, or other type of output device. It will be appreciated that the computer 800 might not include all of the components shown in FIG. 8, may include other components that are not explicitly shown in FIG. 8, or might utilize an architecture completely different than that shown in FIG. 8.

As described herein, the computer 800 may comprise one or more of the imaging device 102, the server(s) 104, client device 142, the network 106, and/or other systems or devices associated with the imaging device 102, the server(s) 104, client device 142, and/or the network 106, and/or remote from the imaging device 102, the server(s) 104, client device 142, and/or the network 106. The computer 800 may include one or more hardware processor(s) such as the CPUs 804 configured to execute one or more stored instructions. The CPUs 804 may comprise one or more cores. Further, the computer 800 may include one or more network interfaces configured to provide communications between the computer 800 and other devices, such as the communications described herein as being performed by the imaging device 102, the server(s) 104, client device 142, the network 106, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for the imaging device 102, the server(s) 104, client device 142, the network 106 as described herein. The programs 822 may enable the devices described herein to perform various operations.

CONCLUSION

The examples described herein provide systems, methods, and non-transitory computer-readable medium storing instructions that, when executed, causes a processor to perform operations to display a three-dimensional (3D) space. The method may include, with an imaging device, capturing a first series of frames as the imaging device travels from a first location to a second location within a space, and capturing a second series of frames as the imaging device travels from the second location to the first location. The method may also include determining a first segment in the first series of frames that matches a second segment in the second series of frames to create a segmentation dataset, generating video clip data based on the segmentation dataset, the video clip data defining a series of video clips, and displaying the series of video clips.

With the above-described systems and methods, and non-transitory computer-readable medium storing instructions, a number of frames within the segmentation data may be matched to provide for the an uninterrupted, coherent, consistent, and logical depiction of the subject space. In this manner, it is never explicitly apparent to the end user that video clips created from the matched segmentation data are being used to store the series of equilateral images that comprise the travel path. Further, in this manner, it is never made apparent to the end user that there are multiple video clips that are being switched between as the end user navigates the virtual space defining the subject space (e.g., the interior of the building). To the end user, navigation of the virtual space created by the presentation of the video clip data will present a sense that the end user is walking through the subject space in a fluid, unabridged, and/or non-disjointed manner much like movement within a virtual space of a first-person video game allows a player to move, but with the subject space (e.g., a real physical space) being portrayed. Further, to the end user, navigation of the virtual space created by the presentation of the video clip data will lack any disjointed views of the subject space since no images are morphed or stretched, and, instead frames exist within the video clip data to visually represent all angles of view and directions of travel.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative some examples that fall within the scope of the claims of the application.

What is claimed is:

1. A non-transitory computer-readable medium storing instructions that, when executed, causes a processor to perform operations comprising:
   creating a segmentation dataset based on a first segment in a first series of frames captured along a first direction of a path that matches a second segment in a second series of frames captured along a second direction of the path, the first direction being opposite the second direction along the path;
   generating video clip data based on the segmentation dataset, the video clip data defining a series of video clips; and
   with an imaging device:
      capturing the first series of frames as the imaging device travels from a first location to a second location within a space, and
      capturing the second series of frames as the imaging device travels from the second location to the first location,
   wherein the imaging device captures the first series of frames and the second series of frames for the segmentation dataset, and
   wherein the segmentation dataset is created based at least in part on metadata derived via execution of a visual simultaneous location and mapping (VSLAM) process.

2. The non-transitory computer-readable medium of claim 1,
   wherein the imaging device captures the first series of frames and the second series of frames in a single video clip.

3. The non-transitory computer-readable medium of claim 1, further comprising presenting the series of video clips comprising:
   detecting instructions to advance along the second direction of the path at an intermediate portion of the first segment along the first direction; and
   presenting a corresponding portion of the second segment matching the intermediate portion of the first segment.

4. The non-transitory computer-readable medium of claim 1, the operations further comprising:
   defining coordinates and angles of capture of frames in the first series of frames and the second series of frames relative to at least a first frame of the frames; and
   storing the coordinates and the angles of capture as mapping data in a database.

5. The non-transitory computer-readable medium of claim 4, wherein:
   the segmentation dataset is created based at least in part on the mapping data, and the operation of generating the video clip data based on the segmentation dataset comprises:
  normalizing a distance between the frames in the first series of frames and the second series of frames within a space based on the mapping data;
  removing a frame of the first series of frames or the second series of frames to normalize a distance traveled along the first segment and the second segment to obtain normalized segments; and
  storing the normalized segments as the segmentation dataset.

6. The non-transitory computer-readable medium of claim 1, the operations further comprising, based at least in part on the video clip data, identifying an endpoint of a first video clip and a second video clip of the series of video clips.

7. The non-transitory computer-readable medium of claim 6, the operations further comprising:
  defining the endpoint as a decision point within a space at which at least three available directions of movement within the space are presented via a user interface displaying the series of video clips; and
  presenting on the user interface a direction selection defining a direction from the endpoint, a turning selection defining a turning around at the endpoint, one of the first video clip or the second video clip defining movement in a direction based on the direction selection, or a third video clip of a turning around movement based on the turning selection.

8. A client device comprising:
a processor; and
a non-transitory computer-readable media storing instructions that, when executed by the processor, causes the processor to perform operations comprising:
  creating a segmentation dataset based on a first segment in a first series of frames captured along a first direction of a path that matches a second segment in a second series of frames captured along a second direction of the path, the first direction being opposite the second direction along the path;
  generating video clip data based on the segmentation dataset, the video clip data defining a series of video clips; and
  with an imaging device:
    capturing the first series of frames as the imaging device travels from a first location to a second location within a space, and
    capturing the second series of frames as the imaging device travels from the second location to the first location, and
  wherein the segmentation dataset is created based at least in part on metadata derived via execution of a visual simultaneous location and mapping (VSLAM) process.

9. The client device of claim 8, wherein the imaging device captures the first series of frames and the second series of frames in a single video clip.

10. The client device of claim 8, wherein the imaging device is a 360 degree video capture device.

11. The client device of claim 8, the operations further comprising:
  defining coordinates and angles of capture of frames in the first series of frames and the second series of frames relative to at least a first frame of the frames; and
  storing the coordinates and angles of capture as mapping data in a database, wherein:
  the segmentation dataset is created based at least in part on the mapping data, and
  the generating the video clip data based on the segmentation dataset comprises:
    normalizing a distance between the frames in the first series of frames and the second series of frames within a space based on the mapping data;
    removing a frame of the first series of frames or the second series of frames to normalize a distance traveled along the first segment and the second segment to obtain normalized segments; and
    storing the normalized segments as the segmentation dataset.

12. The client device of claim 8, the operations further comprising, based at least in part on the video clip data, identifying an endpoint of a first video clip and a second video clip of the series of video clips.

13. The client device of claim 12, the operations further comprising:
  defining the endpoint as a decision point within a space at which at least three available directions of movement within the space are presented via a user interface displaying the series of video clips; and
  presenting on the user interface a direction selection defining a direction from the endpoint, a turning selection defining a turning around at the endpoint, one of the first video clip or the second video clip defining movement in a direction based on the direction selection, or a third video clip of a turning around movement based on the turning selection.

14. A method of displaying a three-dimensional (3D) space, comprising:
  creating a segmentation dataset based on a first segment in a first series of frames captured along a first direction of a path that matches a second segment in a second series of frames captured along a second direction of the path, the first direction being opposite the second direction along the path;
  generating video clip data based on the segmentation dataset, the video clip data defining a series of video clips and
  with an imaging device:
    capturing the first series of frames as the imaging device travels from a first location to a second location within a space, and
    capturing the second series of frames as the imaging device travels from the second location to the first location, and
  wherein the segmentation dataset is created based at least in part on metadata derived via execution of a visual simultaneous location and mapping (VSLAM) process.

15. The method of claim 14, further comprising:
  defining coordinates and angles of capture of frames in the first series of frames and the second series of frames relative to at least a first frame of the frames; and
  storing the coordinates and the angles of capture as mapping data in a database.

16. The method of claim 15, wherein:
the segmentation dataset is created based at least in part on the mapping data, and
the generating the video clip data based on the segmentation dataset comprises:
  normalizing a distance between the frames in the first series of frames and the second series of frames within a space based on the mapping data;

removing a frame of the first series of frames or the second series of frames to normalize a distance traveled along the first segment and the second segment to obtain normalized segments; and storing the normalized segments as the segmentation dataset.

17. The method of claim 14, further comprising, based at least in part on the video clip data, identifying an endpoint of a first video clip and a second video clip of the series of video clips.

18. The method of claim 17, further comprising:

defining the endpoint as a decision point within a space at which at least three available directions of movement within the space are presented via a user interface displaying the series of video clips; and presenting on the user interface a direction selection defining a direction from the endpoint, a turning selection defining a turning around at the endpoint, one of the first video clip or the second video clip defining movement in a direction based on the direction selection, or a third video clip of a turning around movement based on the turning selection.

19. The method of claim 14, further comprising:

with an imaging device:

capturing a first series of frames as the imaging device travels from a first location to a second location within a space; and capturing a second series of frames as the imaging device travels from the second location to the first location, wherein:

the imaging device captures the first series of frames and the second series of frames in a single video clip, and the imaging device is a 360 degree video capture device.

20. The client device of claim 8, wherein the imaging device captures the first series of frames and the second series of frames for the segmentation dataset.

* * * * *